(12) United States Patent
Sundararajan et al.

(10) Patent No.: US 12,335,102 B2
(45) Date of Patent: Jun. 17, 2025

(54) GEOLOCATION-BASED AUTOMATIC CONFIGURATION OF NETWORK DEVICES

(71) Applicant: Cisco Technology, Inc., San Jose, CA (US)

(72) Inventors: Balaji Sundararajan, Fremont, CA (US); Ankur Bhargava, Pleasanton, CA (US); Bhairav Dutia, Santa Clara, CA (US); Vivek Agarwal, Campbell, CA (US); Aastha Verma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 18/320,136

(22) Filed: May 18, 2023

(65) Prior Publication Data

US 2024/0333598 A1    Oct. 3, 2024

Related U.S. Application Data

(60) Provisional application No. 63/493,179, filed on Mar. 30, 2023.

(51) Int. Cl.
*H04L 41/12* (2022.01)
*H04L 41/0893* (2022.01)
*H04L 41/0894* (2022.01)
*H04L 41/0895* (2022.01)

(52) U.S. Cl.
CPC .......... *H04L 41/12* (2013.01); *H04L 41/0893* (2013.01); *H04L 41/0894* (2022.05); *H04L 41/0895* (2022.05)

(58) Field of Classification Search
CPC . H04L 41/12; H04L 41/0893; H04L 41/0894; H04L 41/0895; H04L 41/08; H04L 41/0803; H04L 41/0886; H04L 41/0806
See application file for complete search history.

(56) References Cited

U.S. PATENT DOCUMENTS

| 7,130,278 | B1 * | 10/2006 | Hennenlotter | .......... H04L 41/22 370/257 |
|---|---|---|---|---|
| 11,228,493 | B1 | 1/2022 | Katukam et al. | |
| 11,398,948 | B2 | 7/2022 | Jeuk et al. | |

(Continued)

OTHER PUBLICATIONS

Geng, X., Lejian, L., & Xiumei, F. (Jan. 2009). A new hierarchical network address structure based on geographical regionalism. In 2009 WRI International Conference on Communications and Mobile Computing (vol. 2, pp. 491-496). IEEE.

(Continued)

*Primary Examiner* — Johnny B Aguiar
(74) *Attorney, Agent, or Firm* — Lee & Hayes, P.C.

(57) ABSTRACT

Systems and methods provide for creating a network device hierarchy among a plurality of nodes. The network device hierarchy may include a plurality of geography-based groups defined by a corresponding number of geolocations. The operations further include associating each of the plurality of geography-based groups with a plurality of different configuration intents, associating each of the plurality of nodes with one of the plurality of geography-based groups, and deploying the plurality of nodes based on their respective one of the geolocations.

18 Claims, 11 Drawing Sheets

(56) References Cited

U.S. PATENT DOCUMENTS

| | | | |
|---|---|---|---|
| 2002/0091819 | A1 | 7/2002 | Melchione et al. |
| 2004/0215649 | A1 | 10/2004 | Whalen et al. |
| 2007/0254618 | A1* | 11/2007 | Vangati .................. H04L 41/22 |
| | | | 455/338 |
| 2010/0082676 | A1 | 4/2010 | Paknad et al. |
| 2010/0180016 | A1 | 7/2010 | Bugwadia et al. |
| 2017/0155619 | A1* | 6/2017 | Amishav ................. H04L 67/51 |
| 2021/0314212 | A1* | 10/2021 | Chandrashekhar ... H04L 67/289 |
| 2021/0409277 | A1* | 12/2021 | Jeuk ........................ H04L 41/12 |
| 2022/0103470 | A1* | 3/2022 | Kulkarni ............ H04L 12/4633 |
| 2022/0210235 | A1* | 6/2022 | Katukam ................ H04L 67/10 |

OTHER PUBLICATIONS

3GPP: "3rd Generation Partnership Project, Technical Specification Group Services and System Aspects, Telecommunication Management, Study on Scenarios for Intent Driven Management Services for Mobile Networks (Release 16)", 3GPP TR 28.812, V0.10.0, 3rd Generation Partnership Project, Mobile Competence Centre, 650, Route Des Lucioles, F-06921, Sophia-Antipolis Cedex, France, vol. SA WG5, Mar. 27, 2020, 48 Pages, XP051861148, Chapters 5.3.6, 5.3.9, 6.3.2, 6.4.5, Figures 5.3.9-1, 6.4.5.1-1.

International Search Report and Written Opinion for International Application No. PCT/US2024/018546, mailed Jun. 19, 2024, 16 Pages.

* cited by examiner

≡ Provider SD-WAN ⊙ Select Resource Group ▾

⊡ Go Back to Configuration Group list config_group_1 Edit

Created: Oct 26, 2022 by admin   Last Updated: Nov 15, 2022   Device solution: sdwan Feature Profiles    Associated Devices
⎯⎯⎯⎯⎯⎯⎯⎯⎯⎯⎯⎯⎯⎯⎯⎯⎯⎯⎯⎯⎯⎯⎯⎯⎯⎯⎯⎯⎯504

Templates

Associated Profiles (5) ⊙                                                    ⟲

> System Profile config_group_1_Basic                              Shared: 1 Groups   Actions ∨ ⎤
                                                                                                │
> Transport & Management Profile config_group_1_WAN                Shared: 1 Groups   Actions ∨ │
                                                                                                │
> Service Profile config_group_1_LAN                               Shared: 1 Groups   Actions ∨ ⎬ 502
                                                                                                │
> Policy Object Profile test_po                                    Shared: 1 Groups   Actions ∨ │
                                                                                                │
> CLI Add-on Profile cli                                           Shared: 1 Groups   Actions ∨ ⎦

GEOLOCATION-BASED AUTOMATIC CONFIGURATION OF NETWORK DEVICES

PRIORITY CLAIM

The present application claims priority to U.S. Provisional Application Ser. No. 63/493,179, filed on Mar. 30, 2023, entitled Network Hierarchy-Based Automatic Onboarding of Network Devices, the disclosure of which is hereby incorporated herein by reference as if set forth in its entirety.

TECHNICAL FIELD

The present disclosure relates generally to computer networking. Specifically, the present disclosure relates to systems and methods for configuring network devices based on their respective geolocation.

BACKGROUND

Wide area networks (WANs) may include any telecommunication network that extends over a large geographic area including on a global scale. Thus, the deployment of a WAN may provide a number of advantages to an organization including the ability to effectively and efficiently communicate with a number of sites within the organization. In many instances, a WAN may include an orchestrator, a management device, a controller device and/or other similar devices to assist an administrator or other user in controlling the onboarding of network devices within the WAN. A global WAN may include a plurality of network devices in a plurality of separate geographical locations. These network devices may communicate with one another and may be in communication with the orchestrator, the management device, the controller device and/or other similar devices.

Each of the plurality of separate geographical locations at which the plurality of network devices are located may require different configurations and/or policy requirements. For example, a first network device located on the West coast of the United States of America (USA) may utilize a first authentication, authorization, and accounting (AAA) server, NetFlow server, and may further include a first set of application-specific policies. A second network device located at, for example, China within the Asia region may include a second set of application policies, compliance policies, and may be communicatively coupled to a second server to the second network device connects. Furthering this example, the global network may include fifteen different types of network devices, and an administrator may be required to provide fifteen separate types of designs for each of the fifteen devices. With potentially thousands of network devices within a global WAN network, this can become a great administrative burden.

Further, management controllers such as the above-mentioned orchestrator, the management device, the controller device and/or other similar devices may be utilized to support computing devices utilized by teleworking employees (e.g., using application oriented networking (AON)) and Internet of things (IoT) computing devices. In these use-cases, the computing devices may have completely different configurations and policies associated with their respective solutions.

Therefore, with the above situations, onboarding of different types of computing devices based on their location is a ubiquitous issue faced by network administrators. These network administrators may benefit from a system and method that would assist in the delivering of appropriate configurations and policies to a computing device based on the solution and the location where it is being onboarded.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a diagram of a group configuration UI including a group configuration intent pane, according to an example of the principles described herein.

DESCRIPTION OF EXAMPLE EMBODIMENTS

Figure 1:
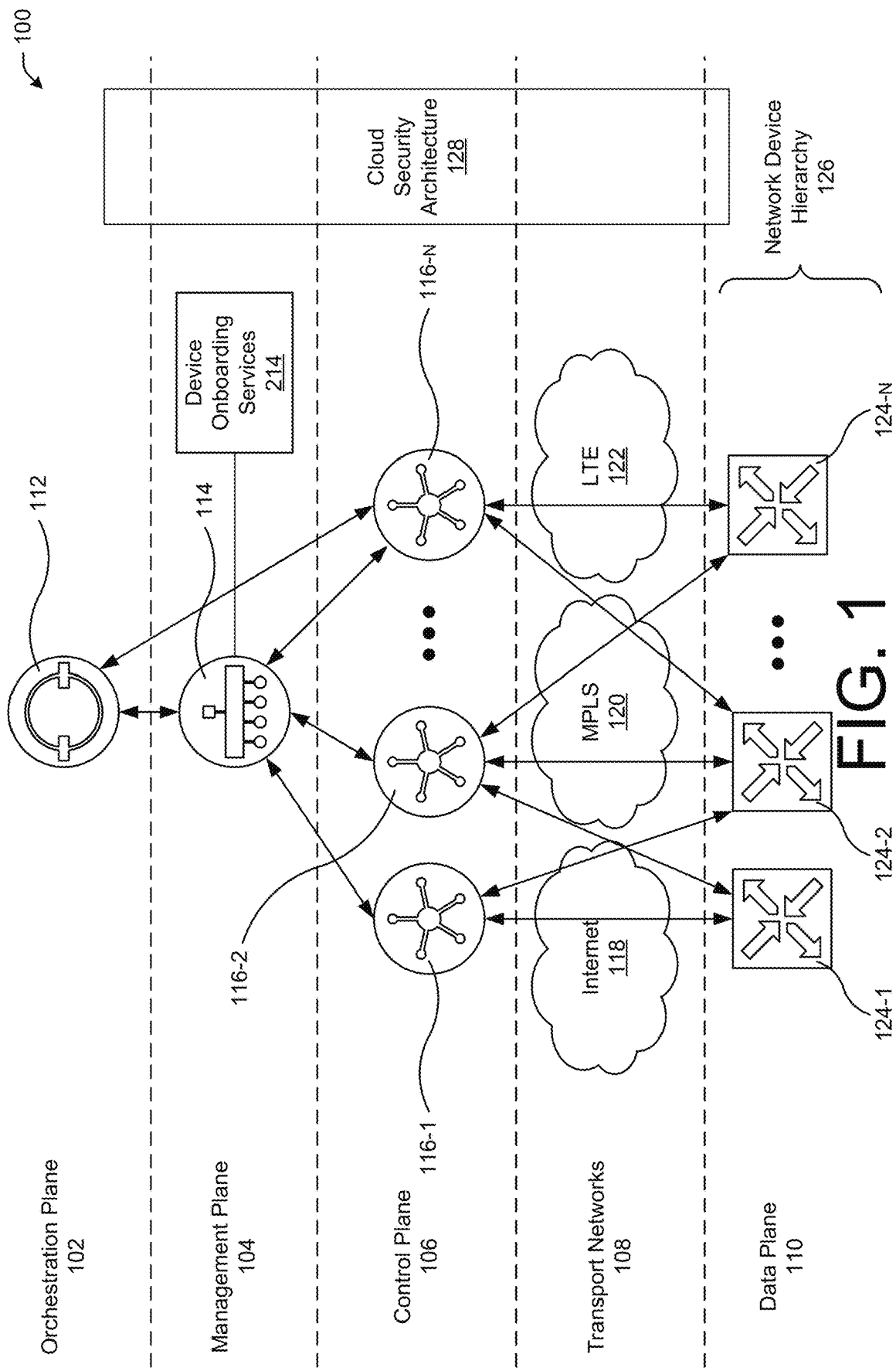
FIG. 1 illustrates a system-architecture diagram of a network, according to an example of the principles described herein.

As mentioned above, due to the many different use-cases associated with a plurality of networked computing devices within a WAN and the need to provide appropriate and correct configurations and policies to those computing devices, a network administrator may greatly benefit from a system and method for geolocation-based delivery of policies, configuration intents, secure access service edge (SASE), and other appropriate settings to a plurality of network devices located throughout the WAN. The present systems and methods utilize network hierarchy constructs to simplify device onboarding for network administrators and for several solutions such as IoT user-cases, teleworker use-cases, and software-defined WAN (SD-WAN) use-cases, etc. A management controller that implements this solution may provide zero-touch deployment of location-driven configuration intents which may assist network administrators to greatly simplify the management of the plurality of geographically diverse network devices.

Overview

In the examples described herein, geolocation-based delivery of policy configuration(s), configuration intent(s), SASE configurations and other settings to network devices may be made autonomous and simplified for a network administrator. By using network hierarchy constructs, a network administrator may simplify device onboarding for several solutions such as IoT, teleworking employees or customers, SD-WANs, and other situations and use cases. The management controller that implements the present systems and methods may provide zero-touch deployment of location-driven intent configurations which may assist a network administrator to greatly simplify the management of network devices.

Examples described herein provide a non-transitory computer-readable medium storing instructions that, when executed, causes a processor to perform operations, including creating a network device hierarchy among a plurality of nodes. The network device hierarchy may include a plurality of geography-based groups defined by a corresponding number of geolocations. The operations further include associating each of the plurality of geography-based groups with a plurality of different configuration intents, associating each of the plurality of nodes with one of the plurality of geography-based groups, and deploying the plurality of nodes based on their respective one of the geolocations.

The geography-based groups include at least a first geography-based group defined at a first geolocation and a second geography-based group defined at a second geolocation within a portion of a geographic boundary of the first geolocation. The operations may further include mapping each of the plurality of nodes to one of the first geolocation and the second geolocation. The geography-based groups may include at least a first geography-based group and a second geography-based group subordinate to the first geography-based group. The plurality of nodes may include at least a first node within the first geography-based group and a second node within the second geography-based group. The second node may inherit at least one attribute of the first node.

The plurality of geography-based groups may include a global geography-based group, a hemisphere geography-based group, a country geography-based group, a region geography-based group, an area geography-based group, or a site geography-based group. The operations may further include configuring the plurality of nodes via a plurality of different configuration intents based on which of the plurality of geography-based groups with which each of the plurality of nodes is associated. The configuration intent may define at least one attribute used to deploy the plurality of nodes in their respective one of the plurality of geography-based groups.

Examples described herein also provide a method of network management, including defining a plurality of geography-based groups within a computing network including a plurality of computing devices. The plurality of geography-based groups may be defined by a corresponding number of geolocations. The method may further include designating a hierarchy among the plurality of geography-based groups based on the geolocations, associating each of the plurality of geography-based groups with a plurality of different configuration intents, and deploying the plurality of computing devices based on their inclusion in one of the plurality of geography-based groups and the plurality of different configuration intents.

The geography-based groups may include at least a first geography-based group defined at a first geolocation and a second geography-based group defined at a second geolocation within a portion of a geographic boundary of the first geolocation. The second geography-based group is subordinate to the first geography-based group. The plurality of computing devices may include at least a first computing device within the first geography-based group and a second computing device within the second geography-based group. The second computing device inherits a first configuration intent of the first geography-based group.

The method may further include mapping each of the plurality of computing devices to one of the plurality of geography-based groups. The plurality of different configuration intents may include at least one policy object, the at least one policy object defining policies associated with the plurality of computing devices within their respective hierarchy among the plurality of geography-based groups. The method may further include determining the geolocations of the plurality of geography-based groups within the network based on an internet protocol (IP) geolocation entry within an IP geolocation database, the IP geolocation entry including the geolocations of the geography-based groups for a plurality of IP addresses.

The method may further include identifying at least one secure Internet gateway (SIG) template for each of the plurality of computing devices based on a device source IP address of the plurality of computing devices. The method may further include configuring a geolocation-specific cloud provider for each of the plurality of computing devices based on the SIG template.

Examples described herein also provide a system for managing a network, including a processor, and a non-transitory computer-readable media storing instructions that, when executed by the processor, causes the processor to perform operations including defining a plurality of geography-based groups within a computing network including a plurality of computing devices. The plurality of geography-based groups may be defined by a corresponding number of geolocations. The operations may further include designating a hierarchy among the plurality of geography-based groups based on the geolocations, associating each of the plurality of geography-based groups with a plurality of different configuration intents, and deploying the plurality of computing devices based on their inclusion in one of the plurality of geography-based groups and the plurality of different configuration intents.

The geography-based groups may include at least a first geography-based group defined at a first geolocation and a second geography-based group defined at a second geolocation within a portion of a geographic boundary of the first geolocation. The second geography-based group is subordinate to the first geography-based group. The plurality of computing devices may include at least a first computing device within the first geography-based group and a second computing device within the second geography-based group. The second computing device inherits a first configuration intent of the first geography-based group.

The operations may further include mapping each of the plurality of computing devices to one of the plurality of geography-based groups. The plurality of different configuration intents may include at least one policy object, the at least one policy object defining policies associated with the plurality of computing devices within their respective hierarchy among the plurality of geography-based groups.

The operations may further include determining the geolocations of the plurality of geography-based groups within the network based on an internet protocol (IP) geolocation entry within an IP geolocation database, the IP geolocation entry including the geolocations of the geography-based groups for a plurality of IP addresses. The operations may further include identifying at least one secure Internet gateway (SIG) template for each of the plurality of computing devices based on a device source IP address of the plurality of computing devices and configuring a geolocation-specific cloud provider for each of the plurality of computing devices based on the SIG template. The plurality of geography-based groups includes a global geography-based group, a hemisphere geography-based group, a country geography-based group, a region geography-based group, an area geography-based group, or a site geography-based group.

Additionally, the techniques described in this disclosure may be performed as a method and/or by a system having non-transitory computer-readable media storing computer-executable instructions that, when executed by one or more processors, performs the techniques described above.

Example Embodiments

Turning now to the figures, FIG. 1 illustrates a system-architecture diagram of a network 100, according to an example of the principles described herein. The network 100 may include a wide area network (WAN), or other type of network environment. In one example, the network 100 may execute on top of one or more transport networks 108 to interconnect geographically distributed Local Area Networks (LANs) or sites that may be made available to a number of network devices 124-1, 124-2, . . . 124-N, where N is any integer greater than or equal to 1 (collectively referred to herein as network device(s) 124 unless specifically addressed otherwise). The network device 124 may also be referred to herein as nodes. In one example, the network devices 124 may include any computing device including, for example, a workstation, a desktop computer, a laptop computer, a tablet computing device, a network appliance, an e-reader, a smartphone, a server, a switch, a router, an edge router, a hub, a bridge, a gateway, a modem, a repeater, an access point, other types of computing devices, and combinations thereof. In one example, the geographically distributed LANs or sites may include, for example, a data center, a campus, a branch office, a cloud service provider network, or other layer 2 (L2) or layer 3 (L3) LANs.

An example of an implementation of the network 100 may include Cisco® Software-Defined WAN (SD-WAN) platform. However, for the network 100 and any other system described herein, there may be additional or fewer components in similar or alternative configurations. The illustrations and examples provided herein are for conciseness and clarity. Other examples may include different numbers and/or types of elements, but such variations do not depart from the scope of the present disclosure.

The network 100 may logically include an orchestration plane 102, a management plane 104, a control plane 106, and a data plane 110. Further, a number of transport networks 108 may form part of the network 100. The orchestration plane 102 may assist in the automatic authentication and registration of the physical and/or virtual network devices of the network 100. Although network devices may be onboarded manually through a command line interface (CLI) where an administrator enters configuration information line by line into each network device and enter operational commands one at a time into each network device in order to read and write status information, this manual method may be error prone and is time consuming. In addition, configuration may be difficult when devices are in remote locations across the entirety of the Earth or when management ports are inaccessible. The orchestration plane 102 may improve upon conventional network onboarding by enabling deployment of the network (e.g., a WAN fabric) as a whole, efficiently and easily, as opposed to a piecemeal approach that deals with individual network devices one at a time, and by automating much of the initialization of the fabric.

The orchestration plane 102 may include one or more physical or virtual WAN orchestrators 112. Although a plurality of orchestrators 112 may be implemented as distinct network appliances, in one example, the orchestrators 112 and the other network devices deployed in the network 100 may be integrated in various combinations. For example, one or more orchestrators 112 may run on the same physical servers as one or more management systems 114 (e.g., WAN management systems) and/or controllers 116 (e.g., WAN fabric controllers) in some cases. In one example, one or more controllers 116 may run on the same physical servers as one or more network devices 124, and so on. The orchestrator 112 may authenticate the management system 114, the controllers 116, the network devices 124, and other network devices deployed in the network 100. Further, the orchestrator 112 may coordinate connectivity among these network devices. The orchestrator 112 may authenticate the network devices using certificates and cryptography and may establish connectivity among the devices using point-to-point (p2p) techniques.

In one example, the orchestrator 112 may have a public network address (e.g., an IP address, a domain name system (DNS) name, etc.) so that the management system 114, the controllers 116, the network devices 124, and other network devices deployed in the network 100 may connect to the orchestrators for onboarding onto the network 100. The orchestrators 112 may coordinate the initial control connections among the management system 114, the controllers 116, the network devices 124, and other network devices deployed in the network 100. For example, the orchestrator 112 may create secure tunnels (e.g., Datagram Transport Layer Security (DTLS), Transport Layer Security (TLS), etc.) to the management system 114 and/or to the controllers 116. The orchestrator 112 may also create secure tunnels (not shown) to the network devices 124 and other network devices in the network 100 so that the devices may mutually authenticate each other. This authentication behavior may assure that only valid devices may participate in the network 100. In one example, the secure connections between the orchestrator 112 and the management system 114 and between the orchestrator 112 and the controllers 116 may be persisted so that the orchestrators may inform the management systems 114 and the controllers 116 when new network devices 124 or other network devices join the network 100. The secure connections with the network devices 124 may be temporary; once the orchestrator 112 has matched an individual network device 124 with an individual controller 116, there may be no need for the orchestrators 112 and the routers to communicate with one another. The orchestrator 112 may share the information that is required for control plane connectivity, and instruct the management system 114, the controllers 116, the network devices 124, and other network devices deployed in the network 100 to initiate secure connectivity with one another.

To provide redundancy for the orchestrator 112, multiple orchestrators may be deployed in the network 100, and different subsets of the management systems 114, the controllers 116, the network devices 124, and other network devices may point to different orchestrators. An individual orchestrator 112 may maintain the secure connections with multiple controllers 116. If one orchestrator 112 becomes unavailable, the other orchestrators 112 may automatically and immediately sustain the functioning of the network 100. In a deployment with multiple controllers 116, the orchestrator 112 may pair an individual network device 124 with one of the controllers 116 to provide load balancing. In one example, one or more physical or virtual Cisco® SD-WAN vBond orchestrators may operate as the orchestrator 112.

The management plane 104 may be responsible for central configuration and monitoring of the network 100, among other tasks. The management plane 104 may include one or more physical or virtual management systems 114. In one example, the management system 114 may provide a dashboard to operate as a visual window for users into the network 100 and allow for the configuration and the administration of the orchestrator 112, the management system 114, the controllers 116, the network devices 124, and other network devices deployed in the network 100. In one example, the management system 114 may be situated in a centralized location, such as, for example, an organizational data center, co-location facility, cloud service provider network, and the like.

The management system 114 may also store certificate credentials and create and store configuration information for the management systems 114, the controllers 116, the network devices 124, and other network devices deployed in the network 100. As network devices of the network 100 come online, they may request their certificates and configuration information from the management system 114, and the management systems 114 may push the certificates and configuration information to the requesting network devices. For cloud-based network devices, the management system 114 may also sign certificates and generate bootstrap configuration information and decommission devices. In one example, the management system 114 may include one or more physical or virtual Cisco® SD-WAN vManage Network Management Systems.

The management plane 104 may also include device onboarding services 214 for providing onboarding of the network devices 124 and hierarchically manage configurations and policy requirements for the network devices 124. As described in more detail herein, the device onboarding services 214 may provide graphical representations of the network 100 and enable an administrator to drill down to display the different hierarchal levels associated with the entire network 100 (e.g., a global network) and the network devices 124, the geolocations of the network devices 124, the group configuration intents of the network devices 124, and other information described herein. The device onboarding services 214 may include a dashboard (e.g., stand-alone or integrated into the dashboard of the management system 114 or other systems) or a number of user interfaces (UIs) that may serve as an interactive overview of the network 100 and the information associated with the network devices 124. For example, the dashboard or UIs may display information regarding the different hierarchal levels associated with the entire network 100 and the network devices 124, the geolocations of the network devices 124, the group configuration intents of the network devices 124, and other information described herein.

Some of the features and functions implemented by the device onboarding services 214 may include creating a network device hierarchy among a plurality of the network devices 124. The network device hierarchy 126 may include a plurality of geography-based groups defined by a corresponding number of geolocations. The features and functions implemented by the device onboarding services 214 may also include associating each of the plurality of geography-based groups with a plurality of different configuration intents, associating each of the plurality of nodes with one of the plurality of geography-based groups, and deploying the plurality of nodes based on their respective one of the geolocations. Further, the features and functions implemented by the device onboarding services 214 may include defining a plurality of geography-based groups within a computing network including a plurality of computing devices such as the network devices 124. The plurality of geography-based groups may be defined by a corresponding number of geolocations. The features and functions implemented by the device onboarding services 214 may also include designating a hierarchy among the plurality of geography-based groups based on the geolocations, associating each of the plurality of geography-based groups with a plurality of different configuration intents, and deploying the plurality of computing devices based on their inclusion in one of the plurality of geography-based groups and the plurality of different configuration intents. The features and functions implemented by the device onboarding services 214 may include any other processes and methods described herein. In one example, one or more physical or virtual Cisco® SD-WAN vManage Network Management Systems may cooperate with the device onboarding services 214, may be included with the device onboarding services 214 as the same device, or may operate as the device onboarding services 214.

The control plane 106 may build and maintain the topology of the network 100 and make decisions on where traffic flows. The control plane 106 may work with the orchestration plane 102 and the management plane 104 to authenticate and register the orchestrator 112, the management system 114, the controllers 116, the network devices 124, and other network devices deployed in the network 100, and to coordinate connectivity among the devices. The control plane 106 may include one or more physical or virtual controllers 116-1, 116-2, . . . 116-N, where N is any integer greater than or equal to 1 (collectively referred to herein as controller(s) 116 unless specifically addressed otherwise). The controllers 116 may oversee the control plane 106, establishing, adjusting, and maintaining the connections that form the fabric of the network 100. Some of the functions and features implemented by the controllers 116 include secure control plane connectivity, management protocol (OMP), authentication, policy, and multiple configuration modes, among others.

An individual controller 116 may establish and maintain an individual secure control plane connection (e.g., DTLS, TLS, etc.) with each other controller 116 of the network 100 as well each individual network device 124 of the network 100. In one example deployments with multiple controllers 116, a single controller 116 may have an individual secure connection to each network device 124 of a subset of all of the network devices 124 of the WAN fabric. In one example, one or more Cisco® SD-WAN vSmart controllers may operate as the controllers 116.

The data plane 110 may include the network devices 124, which may be physical or virtual network devices located at at least a plurality of physical and geographically diverse locations. For example, the globally-located network devices 124 may be located at different hemispheres of Earth, continents, countries, regions, areas, sites, and/or any other type of geographically diverse location classifications.

The network devices 124 may operate within various LANs or sites associated with an organization, such as in one or more data centers, campus networks, branch offices, and co-location facilities, among others, or in the cloud (e.g., Infrastructure as a Service (IaaS), Platform as a Service (PaaS), Software as a Service (SaaS), and other Cloud Service Provider (CSP) networks) (not shown). The network devices 124 may provide secure data plane connectivity among the sites by establishing secure tunnels with one another across one or more carrier or transport networks 108, such as the Internet 118 (e.g., Digital Subscriber Line (DSL), cable, etc.), Multiprotocol Label Switching (MPLS) network 120 (or other private packet-switched network (e.g., Metro Ethernet, Frame Relay, Asynchronous Transfer Mode (ATM), etc.), long-term evolution (LTE) network 122 (or other mobile networks (e.g., 3G, 4G, 5G, etc.)), or other WAN (e.g., synchronous optical networking (SONET), synchronous digital hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.).

Some of the features and functions implemented by each network device 124 may include any data processing performed by users at the diverse geolocations of the network devices 124. An administrator or other individual may be tasked with managing the plurality of network devices 124 and may utilize the management plane 104 and device onboarding services 214 to perform onboarding of the network devices 124 and hierarchically manage configurations and policy requirements for the network devices 124.

Of these four components, the orchestrator 112, the management system 114, the controllers 116, and the network devices 124, the network devices 124 may be hardware devices or software that runs as a virtual machine, and the remaining three may be software-only components. Software associated with the orchestrator 112, the management system 114 and the controllers 116 may run on servers, as a process (e.g., a daemon) on an edge router or similar device or may be executed by any device within the network 100.

The network 100 may further include a network device hierarchy 126 among the network devices 124 as depicted in FIG. 1. However, the orchestrator 112, the management system 114, and the controllers 116, as well as the network devices 124 may also be subjected to the geography-based network hierarchy and device configuration described herein. Therefore, in one example, the network device hierarchy 126 may be applied throughout the network 100.

The network 100 may further include cloud security architecture 128 used to provide a cloud-delivered security service that unifies multiple functions in a single solution that traditionally required multiple on-premises appliances or a plurality of single function cloud security services. The cloud security architecture 128 may include, for example, a secure Internet gateway (SIG), secure web gateway, security service edge (SSE), and/or secure access service edge (SASE), such as, for example, the Cisco® Umbrella® SIG or the Zscaler® Zero Trust Exchange® platform. In one example, the cloud security architecture 128 may identify SIG templates based on a device source IP when the network device 124 is onboarded and ensure that a correct and intended cloud security provider is utilized by that network device 124 based on a defined geographically-specified cloud provider and connected as part of device on-boarding within the network 100.

Figure 2:
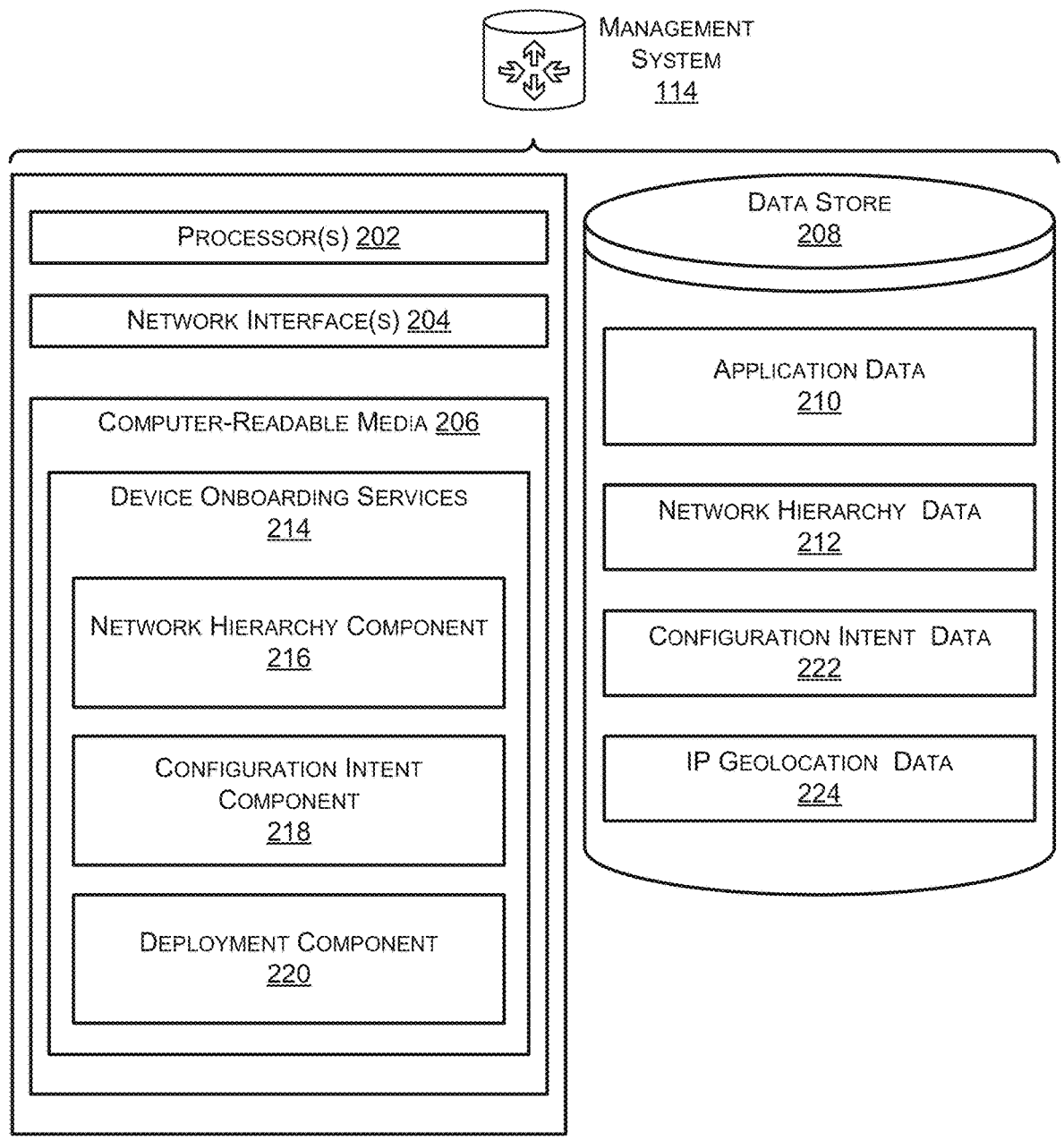
FIG. 2 illustrates a component diagram of example components of a management system including device onboarding services, according to an example of the principles described herein.

FIG. 2 illustrates a component diagram of example components of a management system 114 including device onboarding services 214, according to an example of the principles described herein. As illustrated, the management system 114 may include one or more hardware processor(s) 202 configured to execute one or more stored instructions. The processor(s) 202 may include one or more cores. Further, the management system 114 may include one or more network interfaces 204 configured to provide communications between the management system 114 and other devices, such as devices associated with the system architecture of FIG. 1 including the network 100 as a whole, the orchestrator 112, the controllers 116, the network devices 124, any computing devices associated with the transport networks 108, the cloud security architecture 128, and/or other systems or devices associated with the management system 114 and/or remote from the management system 114. The network interfaces 204 may include devices configured to couple to personal area networks (PANs), wired and wireless local area networks (LANs), wired and wireless wide area networks (WANs), and so forth. For example, the network interfaces 204 may include devices compatible with the orchestrator 112, the controllers 116, the network devices 124, any computing devices associated with the transport networks 108, the cloud security architecture 128 and/or other systems or devices associated with the management system 114.

The management system 114 may also include computer-readable media 206 that stores various executable components (e.g., software-based components, firmware-based components, etc.). In one example, the computer-readable media 206 may include, for example, working memory, random access memory (RAM), read only memory (ROM), and other forms of persistent, non-persistent, volatile, non-volatile, and other types of data storage. In addition to various components discussed herein, the computer-readable media 206 may further store components to implement functionality described herein. While not illustrated, the computer-readable media 206 may store one or more operating systems utilized to control the operation of the one or more devices that include the management system 114. According to one example, the operating system includes the LINUX operating system. According to another example, the operating system(s) include the WINDOWS SERVER operating system from MICROSOFT Corporation of Redmond, Washington. According to further examples, the operating system(s) may include the UNIX operating system or one of its variants. It may be appreciated that other operating systems may also be utilized.

Additionally, the management system 114 may include a data store 208 which may include one, or multiple, repositories or other storage locations for persistently storing and managing collections of data such as databases, simple files, binary, and/or any other data. The data store 208 may include one or more storage locations that may be managed by one or more database management systems. The data store 208 may store, for example, application data 210 defining computer-executable code utilized by the processor 202 to execute the device onboarding services 214 of the computer-readable media 206. The execution of the device onboarding services 214 is described in more detail herein.

Further, the data store 208 may store network hierarchy data 212. The network hierarchy data 212 may include any data associated with the hierarchy of computing devices within the network including the hierarchy of the orchestrator 112, the management system 114, the controllers 116, the network devices 124, any computing devices associated with the transport networks 108, the cloud security architecture 128, and/or other systems or devices associated with the network 100. The network hierarchy data 212 may include location-based data defining a physical location of the computing devices (e.g., the network devices 124) such as a specific address or site of the organization that administrates the network 100. The network hierarchy data 212 may also include geography-based data defining a geographic location (e.g., a geolocation) of the computing devices (e.g., the network devices 124) such as a hemisphere of Earth, a continent, a country, a region, an area, a site, and/or any other type of geographically diverse location classifications. Further, the geography-based data of the network hierarchy data 212 may include relatively more specific geolocation data such as a longitude and latitude of the location of the computing devices (e.g., the network devices 124).

Figure 3:
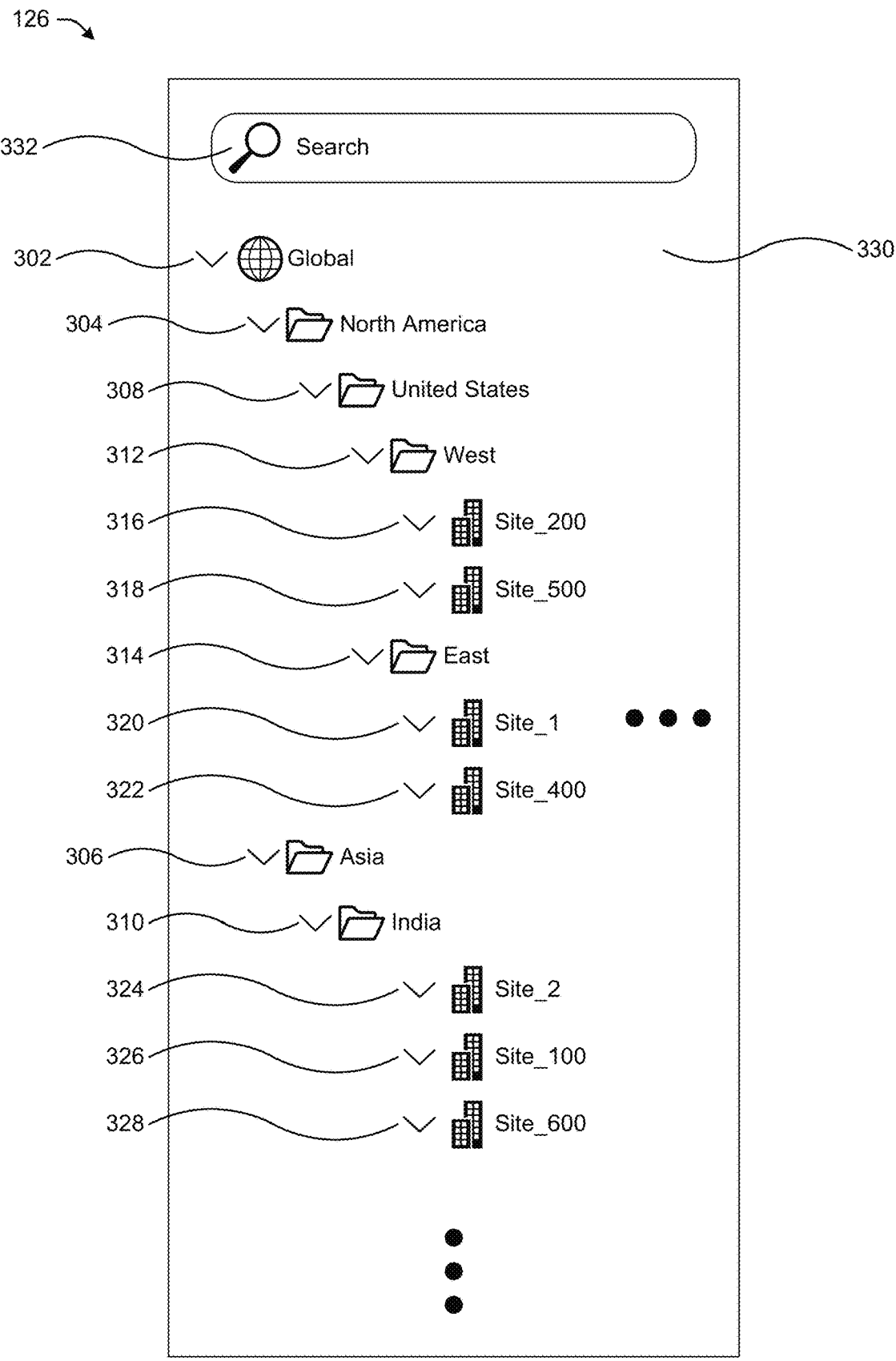
FIG. 3 illustrates a diagram of a geolocation-based network device hierarchy, according to an example of the principles described herein.

Further, the network hierarchy data 212 may include data defining the hierarchy between the computing devices (e.g., the network devices 124) of the network 100. FIG. 3 illustrates a diagram of a geolocation-based network device hierarchy 126, according to an example of the principles described herein. As depicted in FIG. 3, the network device hierarchy 126 may include a top-level classification defined as "Global" 302 that includes any computing device located on the Earth. In one example, the Global 302 level may refer to any computing device of the network 100 located anywhere in the universe, and locations on Earth are provided here as an example of what defines "global." Further, in one example, the Global 302 level may hierarchically include all network devices 124 within the network 100. Although any number of levels or subdivisions within the hierarchy depicted in FIG. 3 and utilized by the present systems and methods, a next level within the network device hierarchy 126 may include a continental level including, for example, North America 304 and Asia 306 included within the global 302 level. A next level may include a country level such as, for example, the United States 308 and India 310 located in the North America 304 and Asia 306 continents, respectively.

A next level may include a region level such as, for example, the West 312 and the East 314 located in the country of the United States 308. It is noted here that the network hierarchy data 212 regarding India 310 may or may not include a region level as depicted in FIG. 3 in connection with the United State 308 and the West 312 and East 314 region levels. The region level may be higher in hierarchy to a site level depicted as Site_200 316 and Site_500 318 of the West 312 region; Site_1 320 and Site_400 322 of the East 314 region; and Site_2 324, Site_100 326, and Site_600 328 of the country of India 310. The site level including Site_200 316, Site_500 318, Site_1 320, Site_400 322, Site_2 324, Site_100 326, and Site_600 328 may include any number of network devices 124 operating at those locations as described in more detail herein.

These nesting hierarchical levels depicted in FIG. 3 allow for an administrator to conveniently identify specific locations and network devices 124 within the network 100 as the administrator is able to drill down to a specific hierarchal level to identify specific network devices 124 and how each level within the hierarchy is nested within another. The horizontal ellipsis depicted in FIG. 3 is included to indicate that the any number of defined levels may be included within the network device hierarchy 126. The vertical ellipsis depicted in FIG. 3 is included to indicate that any number of the network devices 124 may be included within each level of the network device hierarchy 126. Further, the carrots located at the left of each level of the network device hierarchy 126 provide a means for an administrator to selectively open and close nesting levels of the network device hierarchy 126.

As depicted in FIG. 3, the network device hierarchy 126 may be provided to an administrator in the form of a network device hierarchy UI 330 that includes a number of interactive elements including the functionality of the carrots described above and the ability of an administrator to select any element within the network device hierarchy 126 depicted in the network device hierarchy UI 330 to open one or more additional UIs appertaining to that selected element. Further, in one example, the network device hierarchy UI 330 may include a search bar 332 that allows an administrator to search for a specific level within the network device hierarchy 126, specific site, a network device 124, and combinations thereof.

Having described the network hierarchy data 212 and the associated network device hierarchy 126 of the network device hierarchy UI 330, the data store 208 of FIG. 2 may further store configuration intent data 222. The configuration intent data 222 may include any data defining a configuration intent of the network devices 124 within the network 100. The configuration intent may include any number of configuration and policy parameters that are to be pushed to the network devices 124 in order to ensure that the network devices 124 are appropriately and correctly configured within their respective hierarchies and geolocations. In this manner, the configuration intent data 222 may include an identification of a geolocation of the respective network devices 124 and the configuration intent appropriate for that geolocation (e.g., a global configuration intent, a hemispherical (e.g., a hemisphere of the Earth) configuration intent, a continent configuration intent, a country configuration intent, a region configuration intent, an area configuration intent, a site configuration intent, and/or any other configuration intent of any type of geographically diverse location classification).

Further, the data store 208 may store IP geolocation data 224 that defines geolocations of a plurality of geography-based groups such as those defined by the network hierarchy data 212. The IP geolocation data 224 may further define geolocations of a plurality of network devices 124 within the network 100 and the respective geography-based group the network devices 124 belong. The IP geolocation data 224 may be determined based on an internet protocol (IP) geolocation of the network devices 124. The IP geolocation data 224 may include a number of entries within the data store 208. The IP geolocation entries may include the geolocations of the geography-based groups for a plurality of IP addresses of the network devices 124.

In one example, the IP geolocation data 224 may be generated by querying the network devices 124 using an Internet geolocation software capable of deducing the geographic position of the network devices 124 connected to the Internet or other network. For example, the IP addresses of the network devices 124 may be used to determine the country, city, or ZIP code where the network devices 124 are located and, thus, determining the geographical location of the network devices 124. In other examples, determining the geolocation of the network devices 124 may include examination of Wi-Fi hotspots, MAC addresses of the network devices 124, imaging of metadata, obtaining credit card information, and other methods.

The computer-readable media 206 may store portions, or components, of the device onboarding services 214. For example, the device onboarding services 214 of the computer-readable media 206 may include a network hierarchy component 216 to, when executed by the processor(s) 202, create a network device hierarchy 126 among a plurality of network devices 124. The network device hierarchy 126 may include a plurality of geography-based groups (e.g., the levels or classifications described in connection with FIG. 3) defined by a corresponding number of geolocations. Each of the each of the plurality of network devices 124 may be associated with one of the plurality of geography-based groups. The network hierarchy component 216 may, when executed by the processor(s) 202, define a plurality of geography-based groups within the network 100 including a plurality of the network devices 124. The plurality of geography-based groups may be defined by a corresponding number of geolocations. Further, the network hierarchy component 216 may, when executed by the processor(s) 202, designate a hierarchy among the plurality of geography-based groups based on the geolocations. The network hierarchy component 216 may further, when executed by the processor(s) 202, determine the geolocations of the plurality of geography-based groups and/or the network devices 124 within the network 100 based on an internet protocol (IP) geolocation entry within an IP geolocation database such as the IP geolocation data 224 within the data store 208. The IP geolocation entries may include the geolocations of the geography-based groups and/or the network devices 124 for a plurality of IP addresses of the network devices 124.

In one example, the geography-based groups may include at least a first geography-based group defined at a first geolocation and a second geography-based group defined at a second geolocation within a portion of a geographic boundary of the first geolocation. In this example, the second geography-based group may be subordinate to the first geography-based group within the network device hierarchy 126. The plurality of network devices 124 may include at least a first network device 124-1 within the first geography-based group and a second network device 124-2 within the second geography-based group. The second network device 124-2 may inherit a first configuration intent of the first geography-based group due to the fact that the second network device 124-2 is in a hierarchal level that is subordinate to and inherits the configuration intent of a hierarchal level above the second network device 124-2. Providing for this hierarchy-based inherency of configuration intent simplifies onboarding of the network devices 124 for an administrator in several ways such as, for example, not requiring individual configuration of each of the network devices 124 or solution which may number in the thousands or even hundreds of thousands within the network 100. Further, location- or geography-based intent may be easily captured and delivered as part of device onboarding, and inheritance of configuration intent or other settings based on the geography-based group and the hemisphere/continent/country/region/area where the network device 124 is being onboarded to the sites. Still further, the management system 114 and/or the controllers 116 may intelligently deliver solutions and version-based configurations based on the device type of the network devices 124 in addition to the locations of the network devices 124.

The network hierarchy component 216 may further, when executed by the processor(s) 202, map each of the plurality of network devices 124 to one of the plurality of geography-based groups. By mapping the network devices 124 to the geography-based groups within the network device hierarchy 126, the network devices 124 may be identified within the network device hierarchy 126 and may allow for the configuration intent for each of the network devices 124 to be inherited during onboarding.

The device onboarding services 214 of the computer-readable media 206 may further include a configuration intent component 218 to, when executed by the processor(s) 202, configure the plurality of network devices 124 via a plurality of different configuration intents based on which of the plurality of geography-based groups with which each of the plurality of network devices 124 is associated. The plurality of different configuration intents may be defined by the configuration intent data 222. Thus, the plurality of different configuration intents may include at least one policy object. The at least one policy object may include any number of configuration and policy parameters that are to be pushed to the network devices 124 in order to ensure that the network devices 124 are appropriately and correctly configured within their respective hierarchies and geolocations. Further, the configuration intent may define policies associated with the plurality of network devices 124 within their respective hierarchy among the plurality of geography-based groups. The configuration intent component 218 may also, when executed by the processor(s) 202, identify at least one secure Internet gateway (SIG) template for each of the plurality of network devices 124 based on a device source IP address of the respective network devices 124. The configuration intent component 218 may also, when executed by the processor(s) 202, configure a geolocation-specific cloud provider for each of the plurality of network devices 124 based on the SIG template.

The device onboarding services 214 of the computer-readable media 206 may further include a deployment component 220 to, when executed by the processor(s) 202, deploy the plurality of network devices 124 based on their respective one of the geolocations, their hierarchy within the network device hierarchy 126, which group within the network device hierarchy 126 the network devices 124 belong, and/or the configuration intent defined by the configuration intent component 218 and the configuration intent data 222 for the respective group of network devices 124 within the network device hierarchy 126 to which the network devices 124 belong.

Turning again to FIG. 3, FIG. 3 illustrates a diagram of a geolocation-based network device hierarchy 126, according to an example of the principles described herein. As mentioned above, a network device hierarchy UI 330 may be presented to an administrator or other user to assist the administrator in determining the hierarchical layout of the network 100 including the orchestrator 112, the controllers 116, the network devices 124, any computing devices associated with the transport networks 108, the cloud security architecture 128, and/or other systems or devices associated with the management system 114 and/or remote from the management system 114. This will assist the administrator in defining the configuration intent for these computing devices and how each device within the network 100 may inherit a configuration intent from a computing device higher up within the network device hierarchy 126.

Figure 4:
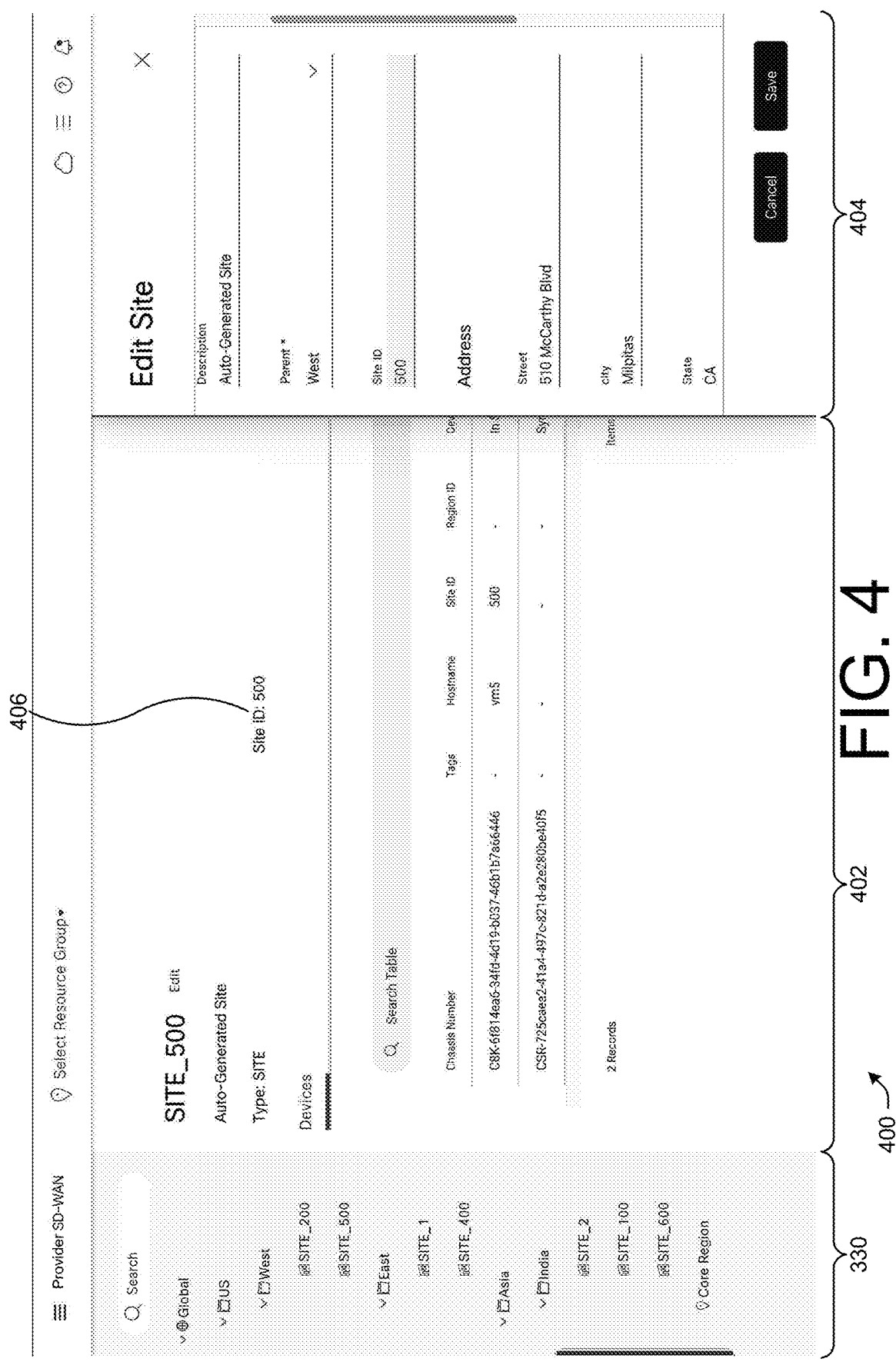
FIG. 4 illustrates a diagram of a user interface (UI) including geolocation assignment of network devices, according to an example of the principles described herein.

FIGS. 4 through 7 illustrates diagrams of a number of UIs an administrator may utilize in hierarchically assigning computing devices within the network 100, assigning geolocations to the computing devices, assigning group configuration intents for each group in the network device hierarchy 126, auto-associating computing devices within the network 100 to a group and/or configuration intent, and auto-deploying a computing device within the network 100. Beginning with FIG. 4, FIG. 4 illustrates a diagram of a geolocation user interface (UI) 400 including geolocation assignment of network devices 124, according to an example of the principles described herein. The network device hierarchy UI 330 of FIG. 3 may be included within the geolocation UI 400. The geolocation UI 400 may include site information 402 that assists an administrator in knowing what network devices 124 and other computing devices within the network 100 are present at a particular site. As depicted in FIG. 4, SITE_500 318 of the west 312 region of the United States 308 (as a country) of North America 304 (as a continent) of the Global 302 or entire network is the subject of this geolocation UI 400. However, any site may be the subject of the geolocation UI 400. The site may be identified by a site identification (ID) 406 (e.g., Site ID: 500) within the site information 402.

The site information 402 may identify for example, two records defining two network devices 124 under a "chassis number": namely, C8K-6f814ea6-34fd-4d19-b037-46b1b7a66446 and CSR-725caea2-41a4-497c-1021d-a2e280be40f5. Additional information may be provided via the site information 402 of the geolocation UI 400 such as, for example, any tags associated with the records, a hostname, a region ID, device status, an indication as to whether the record was added by rule, a data and/or time the computing device associated with the record was last configured, whether the computing device associated with the record is up to date, an indication as to whether there exists any unsupported features of the computing device associated with the record, a data the geolocation UI 400, information regarding when the record(s) in the site information 402 were last updated, other information described herein, and combinations thereof.

The geolocation UI 400 may further include an edit site UI 404. The edit site UI 404 allows for an administrator to change one or more parameters of the site as outlined in the site information 402, one or more parameters of the deployed network device 124 within the site, and/or combinations thereof. The edit site UI 404 allows for an administrator to change, for example, a description (e.g., "auto-generated site"), a parent hierarchal level (e.g., West 312) of the site and/or the network device(s) 124, the site ID 406, a physical address of the site and/or the network device(s) 124 (e.g., 510 McCarthy Blvd., Milpitas, CA), and other information.

FIG. 5 illustrates a diagram of a group configuration UI 500 including a group configuration intent pane 502, according to an example of the principles described herein. The group configuration intent pane 502 may be used by an administrator to change any parameters of any network devices 124 within the configuration group (e.g., configuration group 1 (config_group_1)) that are associated with a hierarchy level within the network device hierarchy 126. In other words, the configuration groups described herein are associated with a hierarchy within the network device hierarchy 126 and a corresponding configuration intent as defined by the group configuration intent pane 502 of the group configuration UI 500. Further, the configuration groups described herein are associated with any configuration applicable to an underlay and/or an overlay of the network 100. A configuration group may include any logical grouping of features or configurations that can be applied to one or more network devices 124 within the network 100 managed by the management system 114. In one example, the configuration intent may describe a number of system settings such as AAA settings, DNS settings, policy settings, and other settings as well as the underlay/overlay configurations needed to onboard any network device 124 in the different geographical locations (e.g., hemisphere, continent, country, region, area, site, etc.) within the network device hierarchy 126.

In FIG. 5, the group configuration UI 500 may include a number of feature profiles 504 and any associated devices within the configuration group. A feature profile 504 may include any flexible building block of configurations that may be reused across different configuration groups. An administrator may create feature profiles 504 based on features that are required, recommended, or uniquely used, and then put together the feature profiles 504 to complete a configuration intent included within the group configuration intent pane 502 of a network device 124. Thus, selection of the feature profiles 504 by an administrator presents a list of feature profiles 504 within the group configuration UI 500 that form the configuration intents within the group configuration intent pane 502 of those devices assigned within a particular configuration group.

A feature profile 504 may include a number of features. The features include the individual capabilities an administrator may want to share across different configuration groups and among different network devices 124 within a particular configuration group. In the example of the config_group_1 of FIG. 5, the feature profiles 504 may include any number of associated profiles (e.g., five associated profiles) that define, via a configuration intent, how the network devices 124 assigned within the group configuration are to be configured. These feature profiles may include, for example, system profiles (e.g., config_group_1_Basic) that define an authentication, authorization, and accounting (AAA) feature; a bidirectional forwarding detection (BFD) feature; a banner feature that assists in configuring a system login banner; a basic feature that assists in configuring basic system-wide functionality of the network devices 124, such as time zone, global positioning system (GPS) location, baud rate of a console connection on a router, etc.; a global feature that assists in enabling or disabling various services on the devices such as hypertext transfer protocol (HTTP), hypertext transfer protocol secure (HTTPS), Telnet, IP domain lookup, etc.; a logging feature that assists in configuring logging to either the local hard drive or a remote host; a network time protocol (NTP) to assist in configuring NTP settings on the network 100; an overlay management protocol (OMP) feature that assists in configuring OMP parameters; an application-layer simple network management protocol (SNMP) to assist in configuring the SNMP functionality on the network devices 124; and a performance monitoring feature to assist in monitoring performance of applications executed within the network 100; among other features.

These feature profiles 504 may also include, for example, a transport and management profile (e.g., Transport & Management Profile config_group_1_WAN) that define transport virtual private network (VPN) features that assist in configuring VPN 0 or a WAN VPN; an ethernet interface feature that assists in configuring Ethernet interface in VPN 0 or the WAN VPN; a management VPN that assists in configuring VPN-512 or a management VPN; a management ethernet interface feature that assists in configuring an Ethernet Interface in VPN-512 or the management VPN; a cellular controller feature that assists in configuring a cellular controller in VPN 0 or the WAN VPN; a cellular profile feature that assists in configuring a cellular profile in VPN 0 or the WAN VPN; a tracker feature that assists in configuring a tracker for the VPN interface; a cellular interface feature that assists in configuring the cellular interface in VPN 0 or the WAN VPN; and a border gateway protocol (BGP) routing feature that assists in configuring the BGP routing in VPN 0 or the WAN VPN; among other features.

These feature profiles 504 may also include, for example, a service profile (e.g., Service Profile config_group_1_LAN) that define a service VPN feature that assists in the configuration of a service VPN (range 1-65527, except 512) or the LAN VPN; a BGP routing feature for service-side routing to provide reachability to networks at the local site; an open shortest path first (OSPF) feature that may be used for service-side routing to provide reachability to networks at the local site; a wireless LAN feature that assists in the configuration of a wireless controller; a switch port feature to configure bridging for Cisco SD-WAN; an ethernet interface feature that assists in the configuration of the Ethernet interface on a service VPN (range 1-65527, except 512); a switch virtual interface (SVI) feature that assist in the configuration of an SVI to configure a VLAN interface; a dynamic host configuration protocol (DHCP) server feature that allows an interface to be configured as a DHCP helper so that it forwards broadcast DHCP requests that it receives from the DHCP servers; a quality of service (QOS) map feature to assist in configuring QoS to classify data packets and control how traffic flows out of and into the interfaces and on interface queues; a route policy feature to enable policy-based routing in instances where certain packets are to be routed through a specific path other than the obvious shortest path; an access control lists (ACLs) IPv4 feature to determine what traffic is blocked and what traffic is forwarded at device interfaces and allow filtering based on source and destination addresses, inbound and outbound to a specific interface; and an ACL IPv6 feature to configure ACL on IPv6 interfaces; among other features.

These feature profiles 504 may also include, for example, a policy object profile (e.g., Service Profile test_po) that define a policy profile feature to enable attaching of policy configurations to a network device 124; an autonomous system (AS) path feature to allow for the specifying of an AS path number; a standard community feature; an extended community feature; a data prefix feature; a class map feature; a mirror feature; a policer feature; and a prefix feature; among other features.

These feature profiles 504 may also include, for example, a command-line interface (CLI) profile (e.g., CLI Add-on Profile.cli) that enables an administrator to specify device configuration in CLI format. Other feature profiles may also be included in the configurable list of the group configuration intent pane 502 of the group configuration UI 500.

Figure 6:
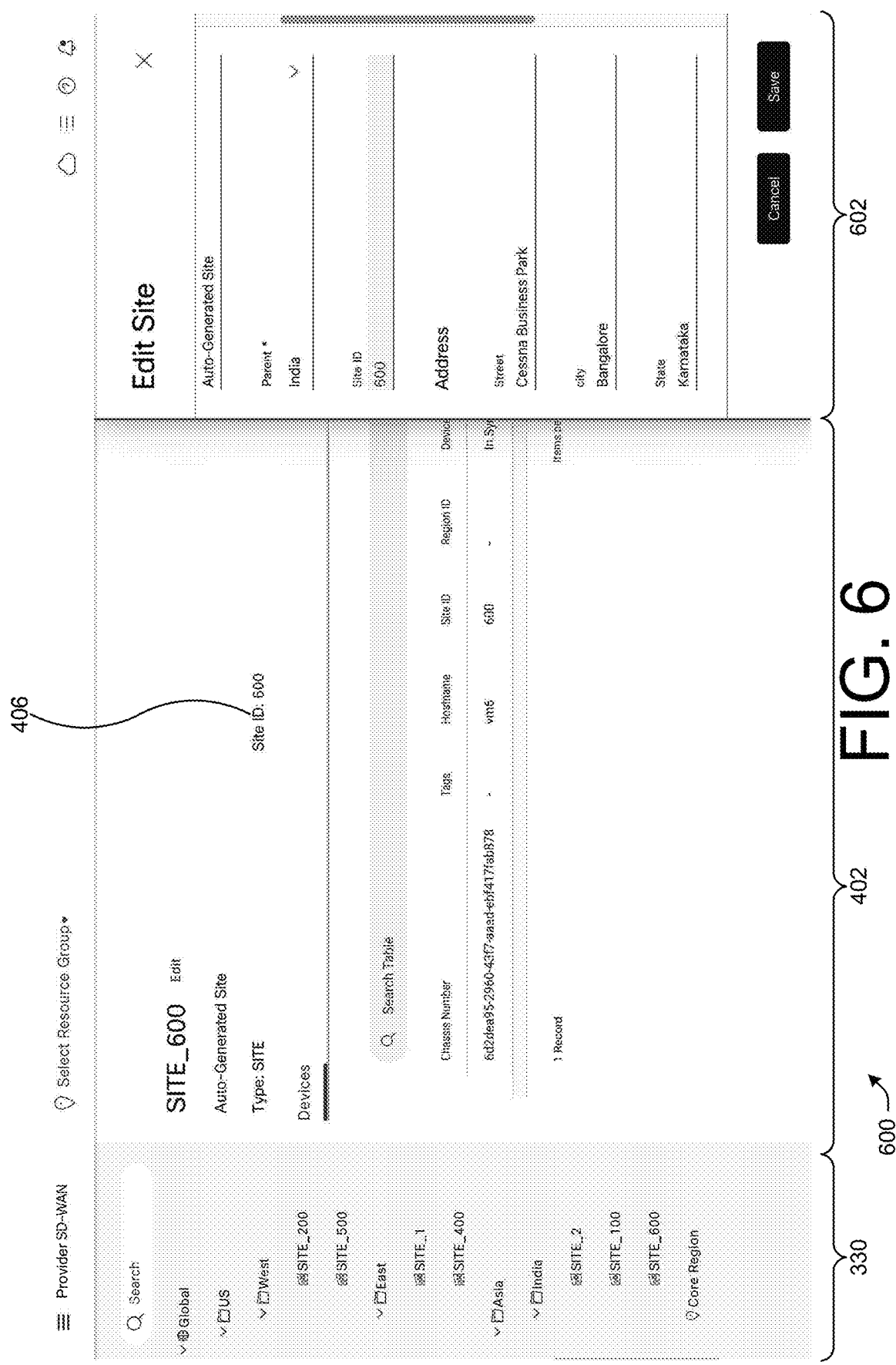
FIG. 6 illustrates a diagram of an auto-association UI including a network device auto-association pane, according to an example of the principles described herein.

FIG. 6 illustrates a diagram of an auto-association UI 600 including a network device auto-association pane 602, according to an example of the principles described herein. FIG. 6 is presented here to provide a second example of a site (e.g., SITE_600 328) within the site information 402 as well as to introduce the concept of auto-association of network devices 124 with the network device hierarchy UI 330 and the network 100.

The network device hierarchy UI 330 of FIG. 3 may be included within the auto-association UI 600 of FIG. 6 in a manner similar to the geolocation UI 400 of FIG. 4. The auto-association UI 600 may include site information 402 that assists an administrator in knowing what network devices 124 and other computing devices within the network 100 are present at a particular site. As depicted in FIG. 6, SITE_600 328 of the India 310 (as a country) of Asia 306 (as a continent) of the Global 302 or entire network is the subject of the auto-association UI 600. However, any site may be the subject of the auto-association UI 600. The site may be identified by a site identification (ID) 406 (e.g., Site ID: 600) within the site information 402. The auto-association UI 600 may further include the auto-association pane 602 that allows for a device to auto-inherit the feature profiles 504 and the group configuration intent 502 of a network device 124 and edit one or more aspects of the site as similarly described above in connection with the site UI 404 of FIG. 4. The auto-association UI 600 provides an administrator with information similar to the geolocation UI 400 of FIG. 4.

Via the auto-association UI 600 of FIG. 6, onboarding of the network devices 124 may be simplified, and, in one example, a WAN connected network device 124 may have an internet transport link available. For example, in a teleworker use-case, and IoT, or similar transport link type, the management system 114 may take advantage of the different types of transport links to determine the IP geolocation of the network devices 124 based on which site (e.g., Site_200 316, Site_500 318, Site_1 320, Site_400 322, Site_2 324, Site_100 326, and Site_600 328) the network devices 124 are connecting from. As described above in connection with FIG. 2, the management system 114 (e.g., the Cisco® vManage®) may include IP geolocation data 224 available to query the location of the network devices 124 based on the transport IP of the network devices 124. Once the IP geolocation data 224 is known, the management system 114 may, via the auto-association UI 600 of FIG. 6, automatically place a network device 124 correctly into the network device hierarchy 126 and store that information as the network hierarchy data 212 within the data store 208 of the management system 114.

The management system 114 may associate each of the plurality of geography-based groups within the network device hierarchy 126 with a plurality of different configuration intents as described herein. Thereafter, when onboarding a network device 124, the auto-association pane 602 of the auto-association UI 600 may be used to automatically associate each of the plurality of network devices 124 with one of the plurality of geography-based groups within the network device hierarchy 126 and deploy the plurality of network devices 124 based on their respective one of the geolocations as defined by the network device hierarchy 126. In this manner, the network devices 124 that are onboarded within the network 100 may be automatically associated with a group within the network device hierarchy 126 via the auto-association UI 600 and the geolocation of the network devices 124.

Figure 7:
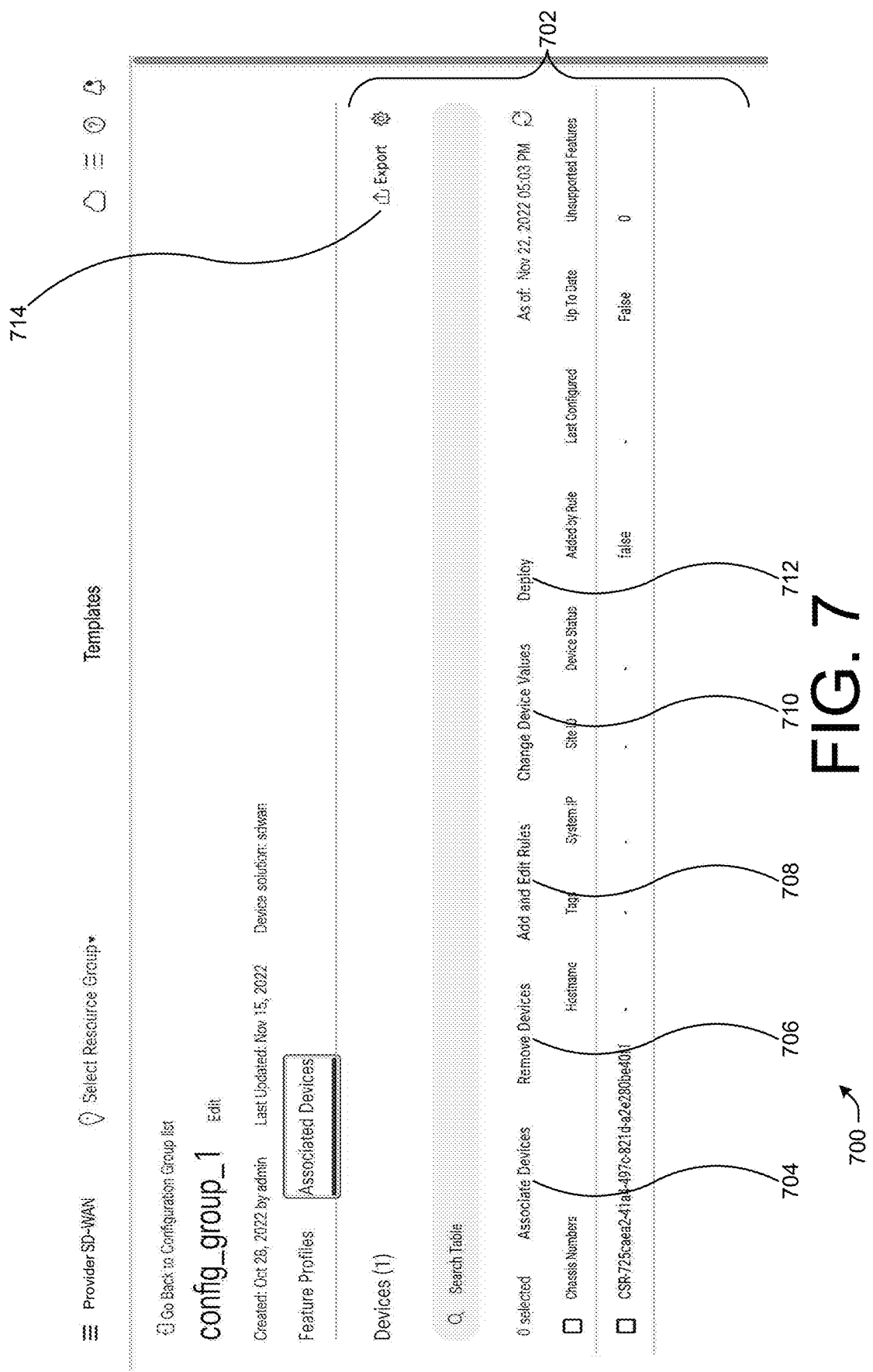
FIG. 7 illustrates a diagram of a configuration group UI including an associated devices pane 702, according to an example of the principles described herein.

FIG. 7 illustrates a diagram of a configuration group UI 700 including an associated devices pane 702, according to an example of the principles described herein. The configuration group UI 700 may include the associated devices pane 702 that allows an administrator to identify a number of network devices 124 that are included within the configuration group such as "config_group_1" as indicated in the example of FIG. 7. The network device(s) that are identified within the config_group_1 of FIG. 7 include CSR-725caea2-41a4-497c-1021d-a2e280be40f1, a chassis number of a router or similar device. The configuration group UI 700 may include a number of selectable elements including, for example, an "Associate Devices" selection 704 to allow an administrator to view and add additional network devices 124 to the configuration group (e.g., config_group_1 of the example of FIG. 7). The configuration group UI 700 may also include the selectable element "Remove Devices" 706 to allow an administrator to remove one or more network devices 124 from the configuration group (e.g., config_group_1 of the example of FIG. 7). The ability of adding and removing network devices 124 to and from the configuration group allows the administrator to dictate what configurations the network devices 124 may have once added to the network 100 and assigned to a group within the network device hierarchy 126.

The configuration group UI 700 may also include the selectable element "Add and Edit Rules" 708 to allow an administrator to add, remove, and edit any rules associated with the configuration group (e.g., config_group_1 of the example of FIG. 7). The configuration group UI 700 may also include the selectable element "Change Device Values" 710 to allow an administrator to change one or more device values associated with the configuration group (e.g., config_group_1 of the example of FIG. 7). The configuration group UI 700 may also include the selectable element "Deploy" 712 to allow an administrator to deploy any changes made to a network device 124 or to initially deploy a network device 124. Once deployed, the network device 124 may inherit the configuration intent defined for the configuration group (e.g., config_group_1 of the example of FIG. 7) via the configuration group UI 700. The configuration group UI 700 may also include an "Export" function 714 to allow for the configuration intent defined by the configuration group UI 700 and for configuration group (e.g., config_group_1 of the example of FIG. 7) to be exported to another configuration group to copy one or more aspects of the configuration intent of the configuration group (e.g., config_group_1 of the example of FIG. 7).

Figure 8:
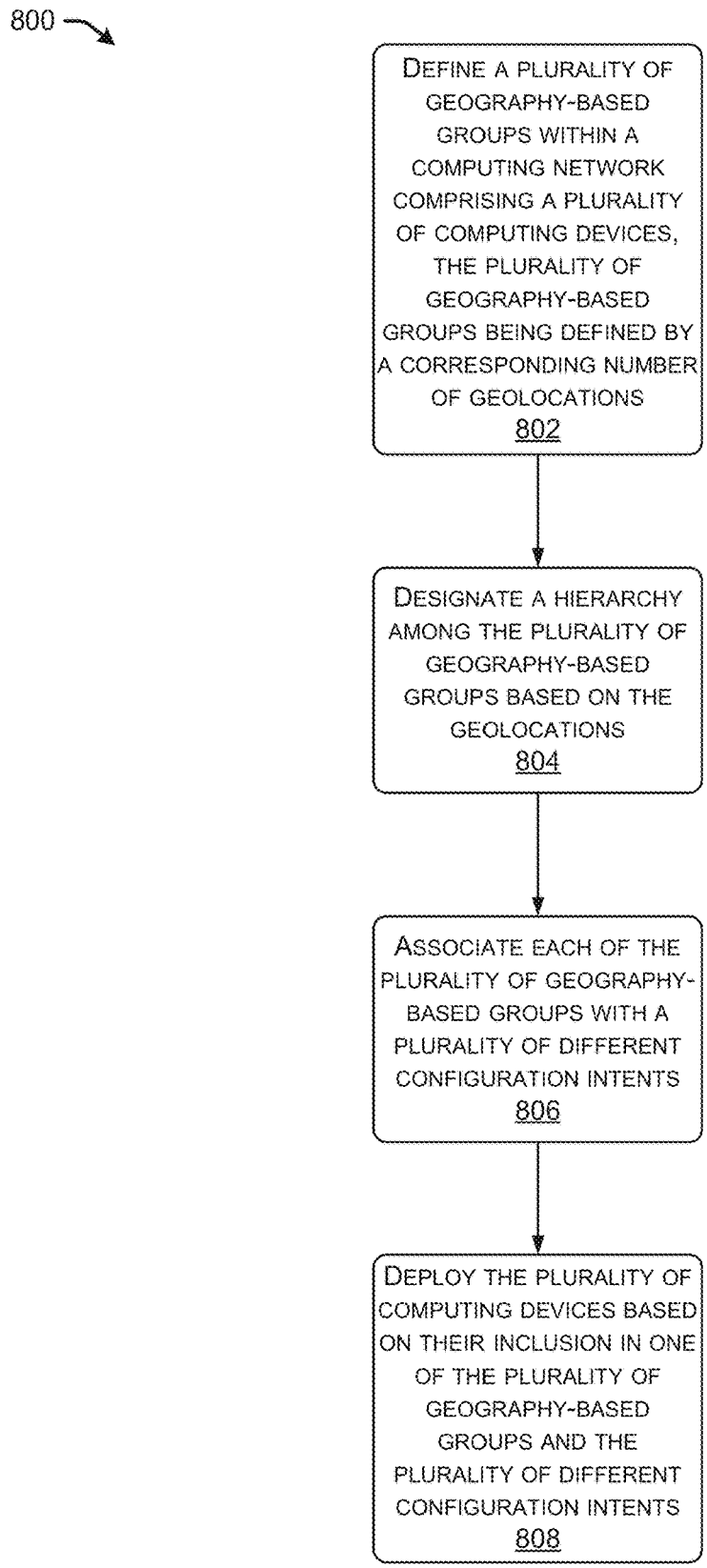
FIG. 8 illustrates a flow diagram of an example method of network management, according to an example of the principles described herein.

FIG. 8 illustrates a flow diagram of an example method 800 of network management, according to an example of the principles described herein. The method 800 of FIG. 8 may include, with the management system 114, defining a plurality of geography-based groups within the network 100 including a plurality of network devices 124 at 802 of FIG. 8. The plurality of geography-based groups may be defined by a corresponding number of geolocations. As described above, the geography-based groups may include, for example, the hemispheres of Earth, continents, countries, regions, areas, sites, and/or any other type of geographically diverse location classifications. These geography-based groups may be defined using the network device hierarchy 126 and the network device hierarchy UI 330. Further, the method 800 at 802 may include creating the network device hierarchy 126 among the plurality of network devices 124. The network device hierarchy 126 may include the plurality of geography-based groups defined by the corresponding number of geolocations.

At 804, the management system 114 may further designate a hierarchy among the plurality of geography-based groups based on the geolocations, and, at 806, associate each of the plurality of geography-based groups with a plurality of different configuration intents. The method 800 at 806 may further include associating each of the plurality of network devices 124 with one of the plurality of geography-based groups. At 808, the management system 114 may deploy the plurality of network devices 124 based on their inclusion in one of the plurality of geography-based groups and the plurality of different configuration intents.

Figure 9:
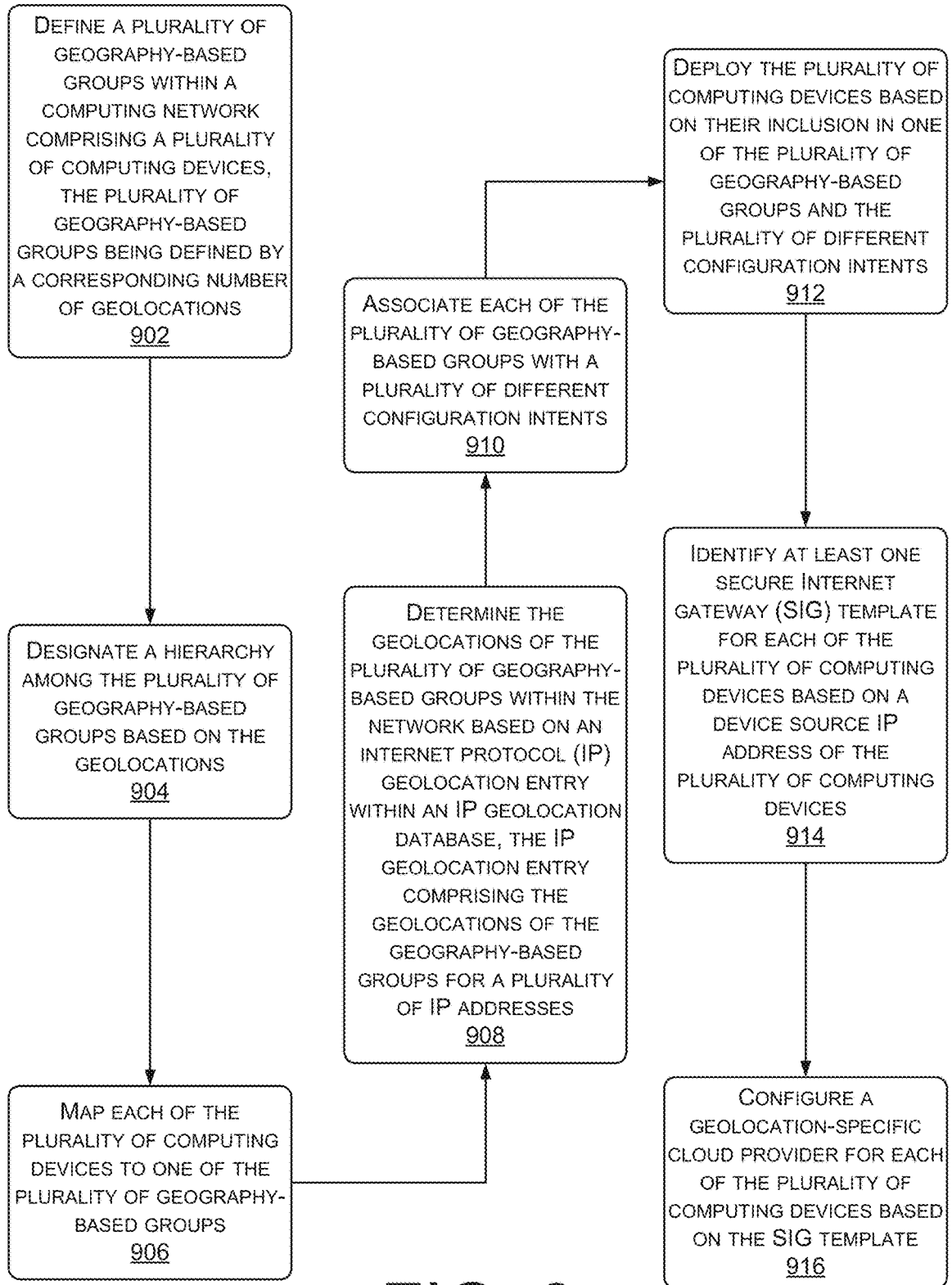
FIG. 9 illustrates a flow diagram of an example method of network management, according to an example of the principles described herein.

FIG. 9 illustrates a flow diagram of an example method 900 of network management, according to an example of the principles described herein. At 902, the method 900 may include, with the management system 114, defining a plurality of geography-based groups within the network 100 including a plurality of network devices 124. The plurality of geography-based groups may be defined by a corresponding number of geolocations. At 904, the management system 114 may further designate a hierarchy among the plurality of geography-based groups based on the geolocations. In one example, the plurality of geography-based groups may include a global geography-based group, a hemisphere geography-based group, a country geography-based group, a region geography-based group, an area geography-based group, a site geography-based group, other types of geographically diverse location classifications, and combinations thereof.

At 906 of the method 900 of FIG. 9, the management system 114 may map each of the plurality of network devices 124 to one of the plurality of geolocations. In one example, the geography-based groups may include at least a first geography-based group defined at a first geolocation and a second geography-based group defined at a second geolocation within a portion of a geographic boundary of the first geolocation. In this example, the mapping performed at 906 may include mapping each of the plurality of network devices 124 to one of the first geolocation and the second geolocation.

The management system 114 may also, at 908 of the method 900 of FIG. 9, determine the geolocations of the plurality of geography-based groups within the network 100 based on an internet protocol (IP) geolocation entry within a data base such as, for example, the IP geolocation data 224. In one example, the IP geolocation entries of the IP geolocation data 224 may include the geolocations of the geography-based groups for a plurality of IP addresses. The IP addresses may include the IP address of the plurality of network devices 124.

At 910 of FIG. 9, the management system 114 may associate each of the plurality of geography-based groups with a plurality of different configuration intents. For example, the configuration group UI 700 may be used by an administrator to define the configuration intents for each of the network devices 124. In one example, the configuration intents for each of the network devices 124 may be defined from and/or saved as the configuration intent data 222. At 912, the management system 114 may deploy the plurality of network devices 124 based on their inclusion in one of the plurality of geography-based groups and the plurality of different configuration intents.

The method 900 may further include identifying at least one secure Internet gateway (SIG) template for each of the plurality of network devices 124 based on a device source IP address of the plurality of network devices at 914. Secure access service edge (SASE) may include any network architecture that combines VPN and SD-WAN capabilities with cloud-native security functions such as, for example, secure web gateways, cloud access security brokers, firewalls, and zero-trust network access. These functions may be delivered from the cloud and provided as a service by a SASE vendor. These SASE vendors may include, for example, the Cisco® Umbrella® SIG or the Zscaler® Zero Trust Exchange® platform and may be selected to ensure that a region specific cloud provider is connected as part of device on-boarding. At 914 of the method 900 of FIG. 9, when the network devices 124 are on-boarded, a number of SIG templates may be identified based on the SIG templates identified by, for example, the network hierarchy component 216 and in conjunction with the IP geolocation data 224 stored in the data store 208 of the management system 114. Thus, at 916, the management system 114 may configure a geolocation-specific cloud provider for each of the plurality of network devices 124 based on the SIG template(s).

In one example, the network 100 may include a first data center (e.g., a first network device 124-1) at Site_2 324 of the country of India 310 within the Asia 306 region of the global 302 network hierarchy and a second data center (e.g., a second network device 124-2) at Site_200 316 of the country of the West 312 area within the United States 308 within the North America 304 region of the global 302 network hierarchy. In this example, during onboarding of the first data center and the second data center, an administrator may apply different configuration intents to the first data center and the second data center, and, by so doing, the first data center and the second data center are automatically redirected to a correct and specific geolocation-specific cloud provider. Thus, geolocation-based policies and geolocation-based configuration intents may be applicable in multiple areas of networking.

Figure 10:
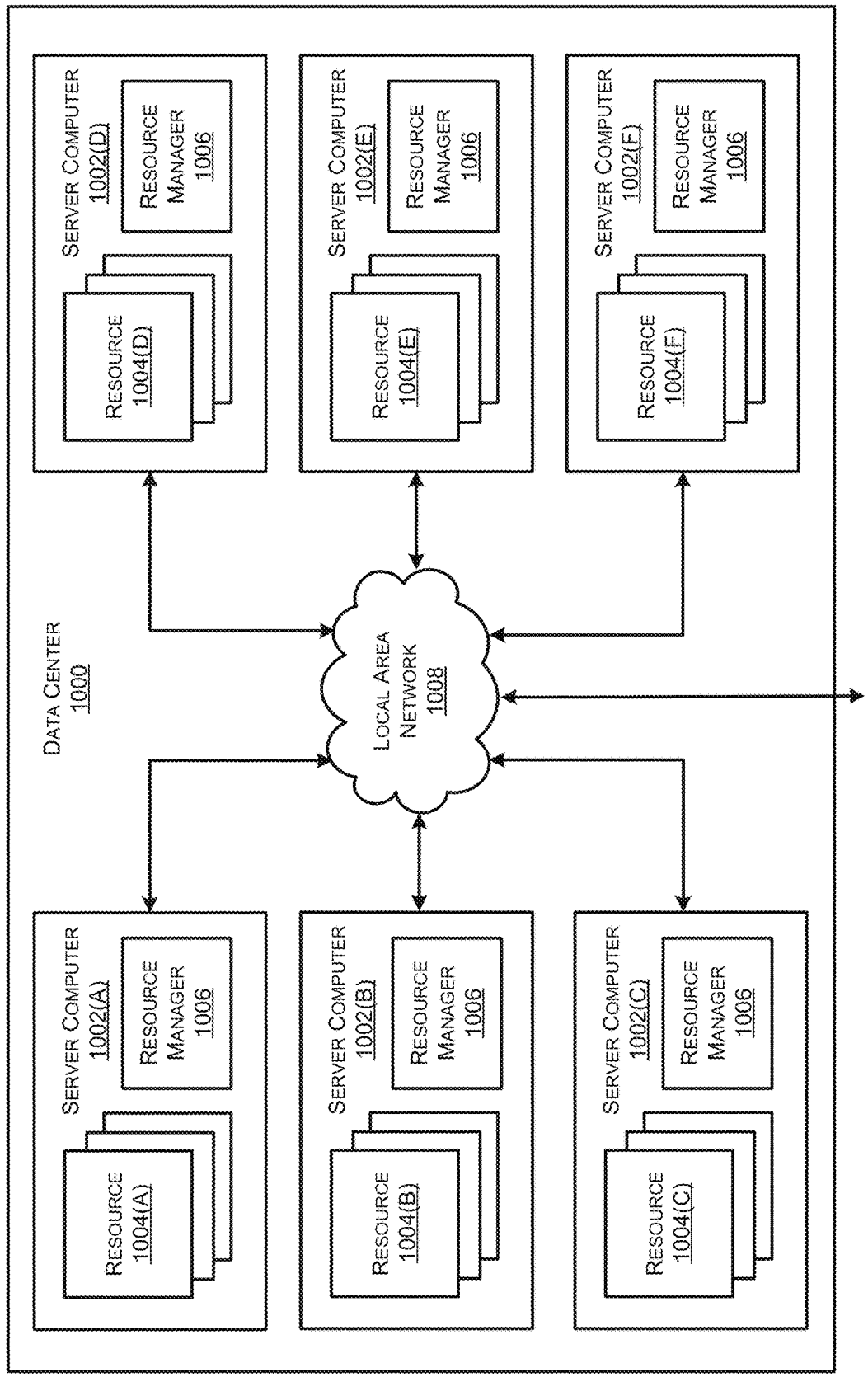
FIG. 10 illustrates a computing system diagram illustrating a configuration for a data center that may be utilized to implement aspects of the technologies disclosed herein.

FIG. 10 illustrates a computing system diagram illustrating a configuration for a data center 1000 that may be utilized to implement aspects of the technologies disclosed herein. The example data center 1000 shown in FIG. 10 includes several server computers 1002A-1002F (which might be referred to herein singularly as "a server computer 1002" or in the plural as "the server computers 1002) for providing computing resources. In some examples, the resources and/or server computers 1002 may include, or correspond to, any type of networked device described herein. Although described as servers, the server computers 1002 may include any type of networked device, such as servers, switches, routers, hubs, bridges, gateways, modems, repeaters, access points, etc.

The server computers 1002 may be standard tower, rackmount, or blade server computers configured appropriately for providing computing resources. In some examples, the server computers 1002 may provide computing resources 1004 including data processing resources such as VM instances or hardware computing systems, database clusters, computing clusters, storage clusters, data storage resources, database resources, networking resources, virtual private networks (VPNs), and others. Some of the server computers 1002 may also be configured to execute a resource manager 1006 capable of instantiating and/or managing the computing resources. In the case of VM instances, for example, the resource manager 1006 may be a hypervisor or another type of program configured to enable the execution of multiple VM instances on a single server computer 1002. Server computers 1002 in the data center 1000 may also be configured to provide network services and other types of services.

In the example data center 1000 shown in FIG. 10, an appropriate LAN 1008 is also utilized to interconnect the server computers 1002A-1002F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 1000, between each of the server computers 1002A-1002F in each data center 1000, and, potentially, between computing resources in each of the server computers 1002. It may be appreciated that the configuration of the data center 1000 described with reference to FIG. 10 is merely illustrative and that other implementations may be utilized.

In some examples, the server computers 1002 and or the computing resources 1004 may each execute/host one or more tenant containers and/or virtual machines to perform techniques described herein.

In some instances, the data center 1000 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 1004 provided by the cloud computing network may include various types of computing resources, such as data processing resources like tenant containers and VM instances, data storage resources, networking resources, data communication resources, network services, VPN instances, and the like.

Each type of computing resource 1004 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 1004 not mentioned specifically herein.

The computing resources 1004 provided by a cloud computing network may be enabled in one example by one or more data centers 1000 (which might be referred to herein singularly as "a data center 1000" or in the plural as "the data centers 1000). The data centers 1000 are facilities utilized to house and operate computer systems and associated components. The data centers 1000 typically include redundant and backup power, communications, cooling, and security systems. The data centers 1000 may also be located in geographically disparate locations. One illustrative example for a data center 1000 that may be utilized to implement the technologies disclosed herein is described herein with regard to, for example, FIGS. 1 through 9.

Figure 11:
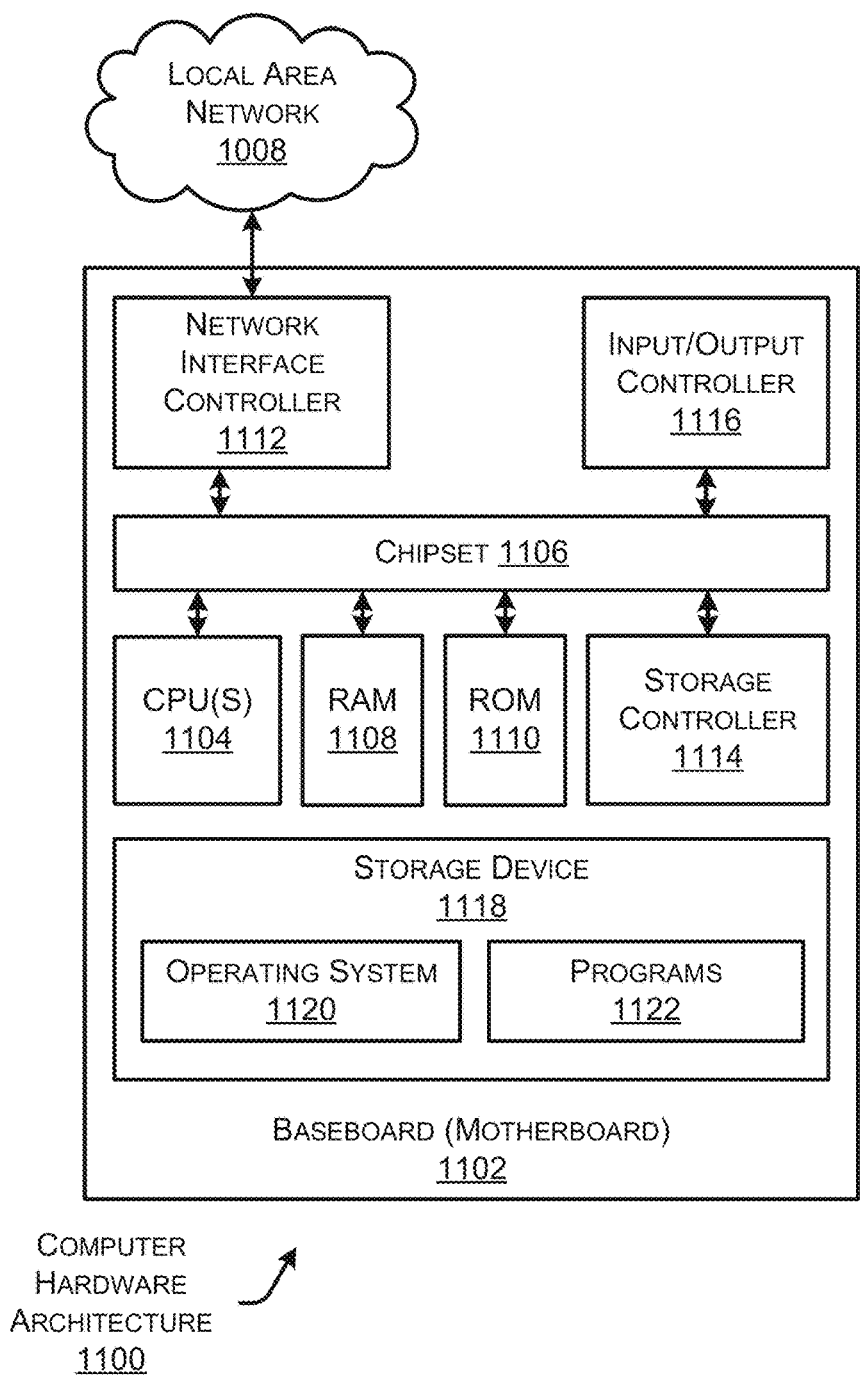
FIG. 11 illustrates a computer architecture diagram showing an example computer hardware architecture for implementing a computing device that may be utilized to implement aspects of the various technologies presented herein.

FIG. 11 illustrates a computer architecture diagram showing an example computer hardware architecture 1100 for implementing a computing device that may be utilized to implement aspects of the various technologies presented herein. The computer hardware architecture 1100 shown in FIG. 11 illustrates the network 100 as a whole, the orchestrator 112, the controllers 116, the network devices 124, any computing devices associated with the transport networks 108, the cloud security architecture 128, and/or other systems or devices associated with the management system 114 and/or remote from the management system 114, a workstation, a desktop computer, a laptop, a tablet, a network appliance, an e-reader, a smartphone, or other computing device, and may be utilized to execute any of the software components described herein. The computer hardware architecture 1100 may, in some examples, correspond to a network device (e.g., network 100 as a whole, the orchestrator 112, the controllers 116, the network devices 124, any computing devices associated with the transport networks 108, and/or the cloud security architecture 128, (and associated devices) described herein, and may include networked devices such as servers, switches, routers, hubs, bridges, gateways, modems, repeaters, access points, etc.

The computer hardware architecture 1100 includes a baseboard 1102, or "motherboard," which is a printed circuit board to which a multitude of components or devices may be connected by way of a system bus or other electrical communication paths. In one illustrative configuration, one or more central processing units (CPUs) 1104 operate in conjunction with a chipset 1106. The CPUs 1104 may be standard programmable processors that perform arithmetic and logical operations necessary for the operation of the computer hardware architecture 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a RAM 1108, used as the main memory in the computer hardware architecture 1100. The chipset 1106 may further provide an interface to a computer-readable storage medium such as a read-only memory (ROM) 1110 or non-volatile RAM (NVRAM) for storing basic routines that help to startup the computer hardware architecture 1100 and to transfer information between the various components and devices. The ROM 1110 or NVRAM may also store other software components necessary for the operation of the computer hardware architecture 1100 in accordance with the configurations described herein.

The computer hardware architecture 1100 may operate in a networked environment using logical connections to remote computing devices and computer systems through a network, such as the network 100 as a whole, the orchestrator 112, the controllers 116, the network devices 124, any computing devices associated with the transport networks 108, and/or the cloud security architecture 128, among other devices. The chipset 1106 may include functionality for providing network connectivity through a Network Interface Controller (NIC) 1112, such as a gigabit Ethernet adapter. The NIC 1112 is capable of connecting the computer hardware architecture 1100 to other computing devices within the network 100 and external to the network 100. It may be appreciated that multiple NICs 1112 may be present in the computer hardware architecture 1100, connecting the computer to other types of networks and remote computer systems. In some examples, the NIC 1112 may be configured to perform at least some of the techniques described herein, such as packet redirects and/or other techniques described herein.

The computer hardware architecture 1100 may be connected to a storage device 1118 that provides non-volatile storage for the computer. The storage device 1118 may store an operating system 1120, programs 1122 (e.g., any computer-readable and/or computer-executable code described herein), and data, which have been described in greater detail herein. The storage device 1118 may be connected to the computer hardware architecture 1100 through a storage controller 1114 connected to the chipset 1106. The storage device 1118 may consist of one or more physical storage units. The storage controller 1114 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer hardware architecture 1100 may store data on the storage device 1118 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 1118 is characterized as primary or secondary storage, and the like.

For example, the computer hardware architecture 1100 may store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer hardware architecture 1100 may further read information from the storage device 1118 by detecting the physical states or characteristics of one or more particular locations within the physical storage units.

In addition to the storage device 1118 described above, the computer hardware architecture 1100 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer hardware architecture 1100. In some examples, the operations performed by the network 100 as a whole, the orchestrator 112, the controllers 116, the network devices 124, any computing devices associated with the transport networks 108, the cloud security architecture 128, and/or any components included therein, may be supported by one or more devices similar to computer hardware architecture 1100. Stated otherwise, some or all of the operations performed by the network 100 as a whole, the orchestrator 112, the controllers 116, the network devices 124, any computing devices associated with the transport networks 108, the cloud security architecture 128, and/or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 1118 may store an operating system 1120 utilized to control the operation of the computer hardware architecture 1100. According to one example, the operating system 1120 includes the LINUX operating system. According to another example, the operating system includes the WINDOWS® SERVER operating system from MICROSOFT Corporation of Redmond, Washington. According to further examples, the operating system may include the UNIX operating system or one of its variants. It may be appreciated that other operating systems may also be utilized. The storage device 1118 may store other system or application programs and data utilized by the computer hardware architecture 1100.

In one example, the storage device 1118 or other computer-readable storage media is encoded with computer-executable instructions which, when loaded into the computer hardware architecture 1100, transform the computer from a general-purpose computing system into a special-purpose computer capable of implementing the examples described herein. These computer-executable instructions transform the computer hardware architecture 1100 by specifying how the CPUs 1104 transition between states, as described above. According to one example, the computer hardware architecture 1100 has access to computer-readable storage media storing computer-executable instructions which, when executed by the computer hardware architecture 1100, perform the various processes described above with regard to FIGS. 1 through 10. The computer hardware architecture 1100 may also include computer-readable storage media having instructions stored thereupon for performing any of the other computer-implemented operations described herein.

The computer hardware architecture 1100 may also include one or more input/output controllers 1116 for receiving and processing input from a number of input devices, such as a keyboard, a mouse, a touchpad, a touch screen, an electronic stylus, or other type of input device. Similarly, an input/output controller 1116 may provide output to a display, such as a computer monitor, a flat-panel display, a digital projector, a printer, or other type of output device. It will be appreciated that the computer hardware architecture 1100 might not include all of the components shown in FIG. 11, may include other components that are not explicitly shown in FIG. 11, or might utilize an architecture completely different than that shown in FIG. 11.

As described herein, the computer hardware architecture 1100 may include one or more of the network 100 as a whole, the orchestrator 112, the controllers 116, the network devices 124, any computing devices associated with the transport networks 108, the cloud security architecture 128, and/or other systems or devices associated with the management system 114 and/or remote from the management system 114. The computer hardware architecture 1100 may include one or more hardware processor(s) such as the CPUs 1104 configured to execute one or more stored instructions. The CPUs 1104 may include one or more cores. Further, the computer hardware architecture 1100 may include one or more network interfaces configured to provide communications between the computer hardware architecture 1100 and other devices, such as the communications described herein as being performed by the network 100 as a whole, the orchestrator 112, the controllers 116, the network devices 124, any computing devices associated with the transport networks 108, the cloud security architecture 128, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1122 may include any type of programs or processes to perform the techniques described in this disclosure for the network 100 as a whole, the orchestrator 112, the controllers 116, the network devices 124, any computing devices associated with the transport networks 108, and the cloud security architecture 128 as described herein. The programs 1122 may enable the devices described herein to perform various operations.

CONCLUSION

The examples described herein provide simplified systems and methods for onboarding of network devices within a network and provides a network administrator with the ability to onboard the network devices without defining configurations for each individual device or solution. Further, location- or geography-based configuration intent(s) may be easily captured and delivered as part of network device onboarding. Inheritance of configuration intent and policy settings based on the geolocation (e.g., hemispheres of Earth, continents, countries, regions, areas, sites, and/or any other type of geographically diverse location classifications) where the device is being onboarded to local sites is performed autonomously as the administrator utilizes the predefined configuration intent and policy configuration for a specific geolocation. Controllers or similar network devices may intelligently deliver solution- and version-based configurations based on device type in addition to their geolocation.

The present systems and methods target geolocation-based delivery of policy configuration(s), configuration intent(s), SASE configurations and other settings to network devices. By using network hierarchy constructs, a network administrator may simplify device onboarding for several solutions such as IoT, teleworking employees or customers, SD-WANs, and other situations and use cases. The management controller that implements the present systems and methods may provide zero-touch deployment of location-driven intent configurations which may assist a network administrator greatly simplify the management of network devices.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A non-transitory computer-readable medium storing instructions that, when executed, causes a processor to perform operations, comprising:
creating a network device hierarchy among a plurality of nodes, the network device hierarchy comprising a plurality of geography-based groups defined by a corresponding number of geolocations;
associating each of the plurality of geography-based groups with a plurality of different configuration intents;
associating each of the plurality of nodes with one of the plurality of geography-based groups;

deploying the plurality of nodes based on a respective one of the corresponding number of geolocations;
identifying at least one secure Internet gateway (SIG) template for each of the plurality of nodes based on a device source internet protocol (IP) address of the plurality of nodes; and
configuring a geolocation-specific cloud provider for each of the plurality of nodes based on the SIG template.

2. The non-transitory computer-readable medium of claim 1, wherein the geography-based groups comprise at least a first geography-based group defined at a first geolocation and a second geography-based group defined at a second geolocation within a portion of a geographic boundary of the first geolocation.

3. The non-transitory computer-readable medium of claim 2, the operations further comprising mapping each of the plurality of nodes to one of the first geolocation and the second geolocation.

4. The non-transitory computer-readable medium of claim 1, wherein:
the geography-based groups comprise at least a first geography-based group and a second geography-based group subordinate to the first geography-based group,
the plurality of nodes comprise at least a first node within the first geography-based group and a second node within the second geography-based group, and
the second node inherits at least one attribute of the first node.

5. The non-transitory computer-readable medium of claim 1, wherein the plurality of geography-based groups comprises a global geography-based group, a hemisphere geography-based group, a country geography-based group, a region geography-based group, an area geography-based group, or a site geography-based group.

6. The non-transitory computer-readable medium of claim 1, the operations further comprising configuring the plurality of nodes via the plurality of different configuration intents based on which of the plurality of geography-based groups with which each of the plurality of nodes is associated.

7. The non-transitory computer-readable medium of claim 1, wherein the plurality of different configuration intents define at least one attribute used to deploy the plurality of nodes in a respective one of the plurality of geography-based groups.

8. A method of network management, comprising:
defining a plurality of geography-based groups within a computing network comprising a plurality of computing devices, the plurality of geography-based groups being defined by a corresponding number of geolocations;
designating a hierarchy among the plurality of geography-based groups based on the geolocations;
associating each of the plurality of geography-based groups with a plurality of different configuration intents;
deploying the plurality of computing devices based on inclusion of the plurality of computing devices in one of the plurality of geography-based groups and the plurality of different configuration intents;
identifying at least one secure Internet gateway (SIG) template for each of the plurality of computing devices based on a device source internet protocol (IP) address of the plurality of computing devices; and
configuring a geolocation-specific cloud provider for each of the plurality of computing devices based on the SIG template.

9. The method of claim 8, wherein:
the geography-based groups comprise at least a first geography-based group defined at a first geolocation and a second geography-based group defined at a second geolocation within a portion of a geographic boundary of the first geolocation,
the second geography-based group is subordinate to the first geography-based group,
the plurality of computing devices comprise at least a first computing device within the first geography-based group and a second computing device within the second geography-based group, and
the second computing device inherits a first configuration intent of the first geography-based group.

10. The method of claim 8, further comprising mapping each of the plurality of computing devices to one of the plurality of geography-based groups.

11. The method of claim 8, wherein the plurality of different configuration intents comprise at least one policy object, the at least one policy object defining policies associated with the plurality of computing devices within a respective hierarchy among the plurality of geography-based groups.

12. The method of claim 8, further comprising determining the geolocations of the plurality of geography-based groups within the computing network based on an internet protocol (IP) geolocation entry within an IP geolocation database, the IP geolocation entry comprising the geolocations of the geography-based groups for a plurality of IP addresses.

13. A system for managing a network, comprising:
a processor; and
a non-transitory computer-readable media storing instructions that, when executed by the processor, causes the processor to perform operations comprising:
defining a plurality of geography-based groups within a computing network comprising a plurality of computing devices, the plurality of geography-based groups being defined by a corresponding number of geolocations;
designating a hierarchy among the plurality of geography-based groups based on the geolocations;
associating each of the plurality of geography-based groups with a plurality of different configuration intents;
deploying the plurality of computing devices based on inclusion of the plurality of computing devices in one of the plurality of geography-based groups and the plurality of different configuration intents;
identifying at least one secure Internet gateway (SIG) template for each of the plurality of computing devices based on a device source internet protocol (IP) address of the plurality of computing devices; and
configuring a geolocation-specific cloud provider for each of the plurality of computing devices based on the SIG template.

14. The system of claim 13, wherein:
the geography-based groups comprise at least a first geography-based group defined at a first geolocation and a second geography-based group defined at a second geolocation within a portion of a geographic boundary of the first geolocation,
the second geography-based group is subordinate to the first geography-based group,
the plurality of computing devices comprise at least a first computing device within the first geography-based group and a second computing device within the second geography-based group, and the second computing device inherits a first configuration intent of the first geography-based group.

15. The system of claim 13, the operations further comprising mapping each of the plurality of computing devices to one of the plurality of geography-based groups.

16. The system of claim 13, wherein the plurality of different configuration intents comprise at least one policy object, the at least one policy object defining policies associated with the plurality of computing devices within a respective hierarchy among the plurality of geography-based groups.

17. The system of claim 13, the operations further comprising determining the geolocations of the plurality of geography-based groups within the network based on an internet protocol (IP) geolocation entry within an IP geolocation database, the IP geolocation entry comprising the geolocations of the geography-based groups for a plurality of IP addresses.

18. The system of claim 13, wherein the plurality of geography-based groups comprises a global geography-based group, a hemisphere geography-based group, a country geography-based group, a region geography-based group, an area geography-based group, or a site geography-based group.

* * * * *